(12) United States Patent
Zhou et al.

(10) Patent No.: US 11,474,750 B2
(45) Date of Patent: Oct. 18, 2022

(54) STORAGE CONTROL APPARATUS AND STORAGE MEDIUM

(71) Applicant: FUJITSU LIMITED, Kawasaki (JP)

(72) Inventors: Guangyu Zhou, Kawasaki (JP); Yukari Tsuchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/111,580

(22) Filed: Dec. 4, 2020

(65) Prior Publication Data

US 2021/0224002 A1    Jul. 22, 2021

(30) Foreign Application Priority Data

Jan. 21, 2020   (JP) .............................. JP2020-007820

(51) Int. Cl.
  *G06F 3/06*        (2006.01)
  *G06F 9/50*        (2006.01)
(52) U.S. Cl.
  CPC .......... *G06F 3/0665* (2013.01); *G06F 3/0608* (2013.01); *G06F 3/0652* (2013.01); *G06F 3/0656* (2013.01); *G06F 3/0689* (2013.01); *G06F 9/5077* (2013.01)
(58) Field of Classification Search
  CPC .. G06F 3/0665; G06F 3/0689; G06F 12/0868; G06F 3/0608; G06F 3/061; G06F 3/0683; G06F 2212/283; G06F 3/0652; G06F 2212/1016; G06F 3/0644; G06F 2212/262; G06F 2212/312; G06F 9/5077; G06F 3/0656

USPC ......................................................... 711/170
See application file for complete search history.

(56) References Cited

U.S. PATENT DOCUMENTS

| | | | |
|---|---|---|---|
| 2011/0197023 A1* | 8/2011 | Iwamitsu | G06F 3/0604 711/114 |
| 2012/0210087 A1* | 8/2012 | Sugimoto | G06F 3/0631 711/165 |
| 2013/0318196 A1 | 11/2013 | Yamamoto et al. | |
| 2014/0201489 A1* | 7/2014 | Deguchi | G06F 12/0246 711/170 |
| 2015/0161051 A1 | 6/2015 | Aikoh et al. | |

(Continued)

FOREIGN PATENT DOCUMENTS

| | | |
|---|---|---|
| JP | 2015-517697 A | 6/2015 |
| WO | 2013/175529 A1 | 11/2013 |

(Continued)

*Primary Examiner* — Hashem Farrokh
(74) *Attorney, Agent, or Firm* — Fujitsu Patent Center

(57) ABSTRACT

A storage control apparatus comprising: a memory; and a processor coupled to the memory and configured to: receive a release request for a first storage area in a virtual storage area, release, among unit storage areas included in a physical storage area, one or more first unit storage areas allocated to the first storage area from the first storage area, execute overwrite processing of writing 0 to each of the first unit storage areas at a timing asynchronous with the release of the first unit storage areas, and when a write request is received to write data to the virtual storage area, execute write processing in which an unallocated unit storage area among the unit storage areas included in the physical storage area is allocated to a write destination area for the write data in the virtual storage area.

10 Claims, 17 Drawing Sheets

(56) References Cited

U.S. PATENT DOCUMENTS

2017/0017421 A1* 1/2017 Takei .................. G06F 11/2079
2020/0250089 A1* 8/2020 Kamran .............. G06F 11/1471

FOREIGN PATENT DOCUMENTS

WO    2014/007249 A1    1/2014
WO    2017/175350 A1    10/2017

* cited by examiner

FIG. 14

| PHYSICAL POSITION | LOGICAL POSITION | SAVED DATA FLAG | ACCESS FREQUENCY |
|---|---|---|---|
| 0xAAAA | 0xXXXX | 0 | n TIMES |
| 0xBBBB | 0xYYYY | 1 | NULL |
| ... | ... | ... | ... |

152

STORAGE CONTROL APPARATUS AND STORAGE MEDIUM

CROSS-REFERENCE TO RELATED APPLICATION

This application is based upon and claims the benefit of priority of the prior Japanese Patent Application No. 2020-7820, filed on Jan. 21, 2020, the entire contents of which are incorporated herein by reference.

FIELD

Embodiments discussed herein are related to a storage control apparatus and a storage medium.

BACKGROUND

Thin provisioning is a technique that virtualizes a storage capacity to enable efficient use of a physical storage area. In this technique, a virtual volume being a virtual storage area is generated as a target to be accessed by users. Of storage areas in the virtual volume, only storage areas in which data are written are dynamically allocated physical storage areas.

For virtualization of a storage device like thin provisioning, a storage system has been proposed in which, for example, a logical volume provided by a capacity virtualizing function is used as a cache volume allocated a cache area. A computer system has also been proposed in which an input/output (I/O) node is provided with virtual local cache areas corresponding to local cache areas of computation nodes so that the I/O node may integratively manage its cache area and also the local cache areas of the computation nodes.

In the small computer system interface (SCSI) standards, an UNMAP command is one of standard commands related to thin provisioning. The UNMAP command is a command for requesting release of a physical storage area allocated to a virtual volume and is issued, for example, when the virtual volume is to be deleted.

International Publication Pamphlets Nos. WO 2013/175529 and WO 2014/007249 and so on have been disclosed as examples of related art.

SUMMARY

According to an aspect of the embodiments, a storage control apparatus comprising: a memory; and a processor coupled to the memory and configured to: receive a release request for a first storage area in a virtual storage area, release, among unit storage areas included in a physical storage area, one or more first unit storage areas allocated to the first storage area from the first storage area, execute overwrite processing of writing 0 to each of the first unit storage areas at a timing asynchronous with the release of the first unit storage areas, and when a write request is received to write data to the virtual storage area, execute write processing in which an unallocated unit storage area among the unit storage areas included in the physical storage area is allocated to a write destination area for the write data in the virtual storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating a configuration example of a secondary cache management table;

DESCRIPTION OF EMBODIMENTS

Figure 1:
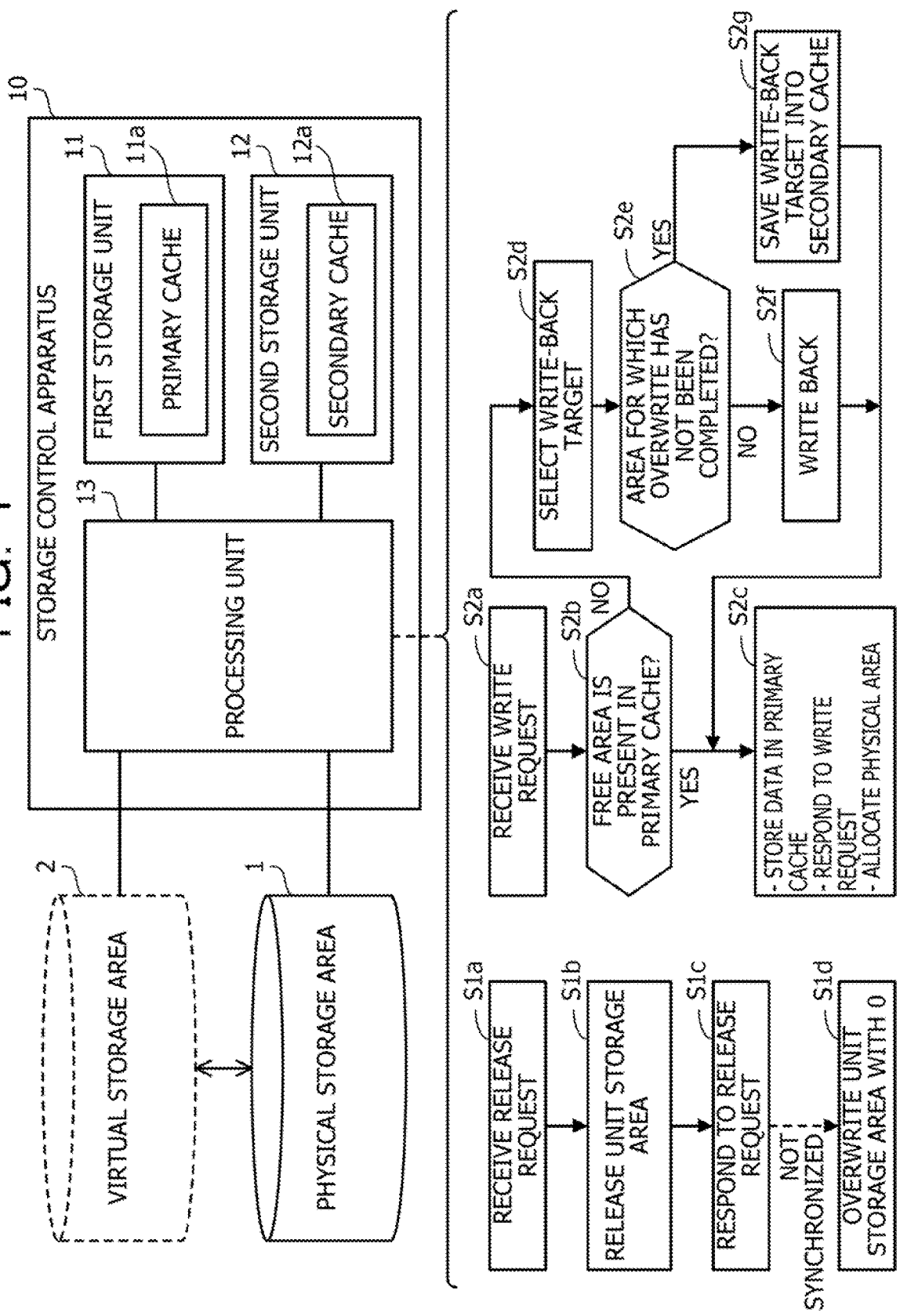
FIG. 1 is a diagram illustrating a configuration example and a processing example of a storage control apparatus according to a first embodiment.

Meanwhile, there has been an idea of, when the above-mentioned UNMAP command is received, not only releasing the designated physical storage area but also executing "0-write processing" of writing a value "0" to the released physical storage area. Executing the 0-write processing may ensure deletion of the data stored in the released physical storage area and thus suppress leakage of the data.

In the case of responding to the UNMAP command after not only releasing the physical storage area but also executing the 0-write processing on the released physical storage area upon receipt of the UNMAP command, the response time will be long. Thus, it is conceivable to employ a method in which, when the UNMAP command is received, the designated physical storage area is only released and a response is made to the UNMAP command, and the 0-write processing is executed on the released physical storage area at a subsequent asynchronous timing. This method, however, has a problem as below.

For example, in a case where a virtual volume is deleted by an UNMAP command, a large number of unit storage areas allocated from a physical storage area to the areas in the virtual volume where data are present are released from the virtual volume and become subject to the 0-write processing. Thus, it takes a certain length of time to execute the 0-write processing on all of these unit storage areas.

Suppose that a virtual volume is deleted, and immediately after it a large amount of data are requested to be written to another virtual volume sharing the same physical storage area. These pieces of data requested to be written are temporarily stored in a cache memory, at which point unallocated unit storage areas are allocated from the above-mentioned physical storage area to the write destination areas for the pieces of data in the virtual volume. At this point, however, the unit storage areas are only reserved to be allocated, and the pieces of data are not stored into the unit storage areas.

In such a situation, a large number of unit storage areas are allocated to the write destination areas for the large amount of data in the virtual volume. The unit storage areas which are now subject to the 0-write processing as mentioned above might include a large number of unit storage areas for which the 0-write processing has not been completed. Thus, the unit storage areas to be allocated to the write destination areas for new pieces of data might include a large number of unit storage areas for which the 0-write processing has not been completed.

If such a situation continues, the cache memory will eventually run out space, and a write-back of old data in the cache memory will have to be performed to further accept a write request for new data. As described above, a unit storage area is allocated (reserved) to the write destination area for data requested to be written at the point when the data is stored in the cache memory, and the data is written to the allocated unit storage area at the time of the write-back of the data.

However, if the allocated unit storage area is a unit storage area for which the 0-write processing has not been completed, it is impossible to perform a write-back of the data in the cache memory to the unit storage area until the 0-write processing is executed. In this case, it takes a long time before executing a write-back to obtain a free area in the cache memory, and writing new data requested to be written to the obtained free area. Accordingly, the response time for a write request will be long.

In a case where there are a large number of unit storage areas for which the 0-write processing has not been completed as in the above, there is a high probability that, when a write-back of data in the cache memory is performed, the write-back destination unit storage area is an area for which the 0-write processing has not been completed. This deteriorates the response performance for a write request for a virtual volume and, in some cases, makes it impossible to accept a write request.

Considering the above, it is desirable to suppress the deterioration in the response performance for a write request due to the processing of writing 0 to released physical storage areas.

Embodiments of the present disclosure are described below with reference to the drawings.

First Embodiment

FIG. 1 is a diagram illustrating a configuration example and a processing example of a storage control apparatus according to a first embodiment. A storage control apparatus 10 illustrated in FIG. 1 includes a first storage unit 11, a second storage unit 12, and a processing unit 13.

This storage control apparatus 10 is capable of accessing a physical storage area 1. The physical storage area 1 is formed of one or more storage devices such as hard disk drives (HDDs) or solid-state drives (SSDs), for example. The storage control apparatus 10 generates a virtual storage area 2, which is implemented by dynamically allocating unit storage areas contained in the physical storage area 1, and receives a request to access the virtual storage area 2 from a host apparatus not illustrated. For example, unit storage areas are allocated from the physical storage area 1 only to areas in the virtual storage area 2 in which data are written. Note that the virtual storage area 2 may contain one or more virtual volumes, for example.

The first storage unit 11 is used as a primary cache 11a. The second storage unit 12 is used as a secondary cache 12a. Note that the first storage unit 11 and the second storage unit 12 are implemented with storage devices included in the storage control apparatus 10.

The processing unit 13 is implemented as a processor included in the storage control apparatus 10, for example. The processing unit 13 controls access to the virtual storage area 2 by using the primary cache 11a and the secondary cache 12a. The secondary cache 12a is used as a read cache, for example.

Processing by the processing unit 13 is specifically described below.

The processing unit 13 is capable of receiving a release request for releasing a unit storage area in the physical storage area 1 allocated to the virtual storage area 2. The release request is issued when a virtual volume contained in the virtual storage area 2 is to be deleted, for example. Note that the release request is an UNMAP command defined by SCSI, for example.

Upon receipt of a release request for, for example, a storage area in part of the virtual storage area 2 (referred to as the first storage area) (step S1a), the processing unit 13 releases the one or more unit storage areas allocated to the first storage area among the unit storage areas contained in the physical storage area 1 (each referred to as the first unit storage area) from the first storage area (step S1b). As a result, each released first unit storage area is managed as an unallocated area. The processing unit 13 then responds to the received release request (step S1c).

The processing unit 13 executes overwrite processing of writing a value "0" to each first unit storage area at a timing asynchronous with the above-mentioned release of the first unit storage area (step S1d). Executing this overwrite processing may ensure deletion of the content of the data stored in the first unit storage area.

With the above processing, when a release request is received, only the release of the corresponding unit storage area is performed, and then a response is made to the release request. Thereafter, the value-"0" overwrite processing for the released unit storage area is executed at a subsequent asynchronous timing. In this way, the response time for a release request may be shorter than that in a case where a response is made after releasing the unit storage area and also executing the value-"0" overwrite processing.

Write processing for the virtual storage area 2 is performed as follows. Each time the processing unit 13 receives a request to write data to the virtual storage area 2 (step S2a), the processing unit 13 executes the process of the next step S2c. In step S2c, the processing unit 13 stores the write data requested to be written into the primary cache 11a and responds to the write request. In step S2c, the processing unit 13 allocates an unallocated unit storage area among the unit storage areas contained in the physical storage area 1 to the write destination area for the write data in the virtual storage area 2. At this point, a unit storage area is only reserved to be allocated to the write destination area for the write data, and the write data is not stored into the unit storage area.

In the actual write processing, when the write request is received, it is determined whether a free area to store the write data is present in the primary cache 11a (step S2b). If the free area is present ("Yes" in step S2b), step S2c is executed. If it is determined that the free area is not present ("No" in step S2b), processing as below is executed.

The processing unit 13 selects write-back-target data for generating a free area in the primary cache 11a from among the pieces of data recorded in the primary cache 11a (step S2d). For example, the data with the most recent last access time is selected as the write-back target. The processing unit 13 identifies the unit storage area (referred to as the second unit storage area) allocated to the write destination area for the selected write-back-target data in the virtual storage area 2 (referred to as the second storage area) among the unit storage areas contained in the physical storage area 1. This second unit storage area is a unit storage area selected and allocated from among the unallocated unit storage areas in the physical storage area 1 when the write-back-target data was stored into the primary cache 11a.

The processing unit 13 determines whether the identified second unit storage area is an area for which the value-"0" overwrite processing has not been completed (step S2e). This determination is made since the second unit storage area might be a unit storage area that has been released from the virtual storage area 2 and become unallocated in step S1b in response to a release request but the overwrite processing in step S1d has not been completed.

If the determination result is "No" in step S2e, for example, if the second unit storage area is an area on which the overwrite processing has been executed or an area which is not subject to the overwrite processing, the processing unit 13 writes (performs a write-back of) the write-back-target data to the second unit storage area (step S2f). In this case, the area for the write-back-target data is released from the primary cache 11a, and thus the processing unit 13 stores the write data to the released area in the primary cache 11a (step S2c).

On the other hand, if the second unit storage area is an area for which the overwrite processing has not been completed ("Yes" in step S2e), it is impossible to write new data to the second unit storage area. In this case, the processing unit 13 saves the write-back-target data from the primary cache 11a into the secondary cache 12a (step S2g). As a result, the area for the write-back-target data is released from the primary cache 11a. Thus, the processing unit 13 stores the write data into the released area in the primary cache 11a and responds to the write request (step S2c).

For the processing performed in the case where the determination result in step S2e is "Yes", one may conceive of a method involving waiting until the value-"0" overwrite processing for the second unit storage area is completed, and performing a write-back of the write-back-target data to the second unit storage area after the overwrite processing is completed. As compared to such a method, the processing by the processing unit 13 described above may shorten the time taken to obtain a free area in the primary cache 11a in the case where the determination result in step S2e is "Yes". This makes it possible to respond to the write request received in step S2a in a shorter time. Accordingly, it is possible to suppress the deterioration in the response performance for a write request due to the value-"0" overwrite processing for a released unit storage area.

Processing as below, for example, may be performed on the write-back-target data saved in the secondary cache 12a. The processing unit 13 checks at a timing asynchronous with the saving into the secondary cache 12a whether the value-"0" overwrite processing for the second unit storage area, which is the write-back destination, has been completed. If the overwrite processing has been completed, the processing unit 13 performs a write-back of the write-back-target data to the second unit storage area.

In a case where, for example, a release request is received in step S1a for deleting a virtual volume, a large number of unit storage areas might be released in step S1b. In this case, the unallocated unit storage areas in the physical storage area 1 might include a large number of unit storage areas for which the value-"0" overwrite processing has not been completed.

In a case where a large amount of data are requested to be written to the virtual storage area 2, a large number of unallocated unit storage areas are allocated to the write data. In this case, if there are a large number of unit storage areas for which the overwrite processing has not been completed as in the above, there is a possibility that the new write data are allocated a large number of unit storage areas for which the overwrite processing has not been completed.

If such a situation continues, the primary cache 11a will eventually run out space, and a write-back of old data in the primary cache 11a will have to be performed to further accept a write request for new data. However, the write-back destination unit storage areas for the write-back-target data might include a large number of unit storage areas for which the value-"0" overwrite processing has not been completed. For this reason, the probability of getting "Yes" as the determination result in step S2e is high. If a write-back to the unit storage areas is performed after waiting until the overwrite processing is completed, the response time for the write request will be significantly delayed.

With the above-described processing by the processing unit 13 in this embodiment, even in such a case, the time of delay in responding to a write request may be shortened, so that the deterioration in response performance may be suppressed.

Second Embodiment

Figure 2:
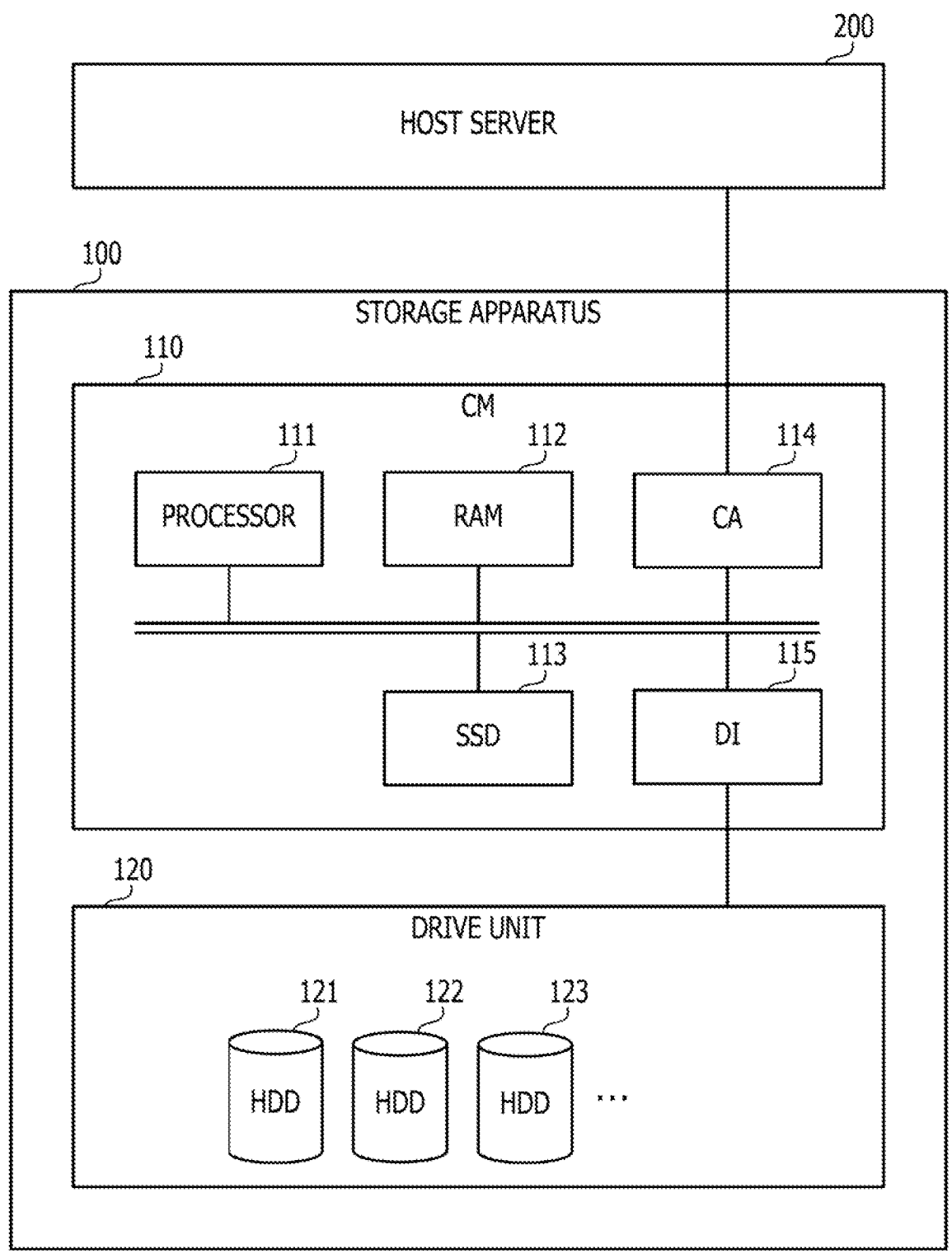
FIG. 2 is a diagram illustrating a configuration example of a storage system according to a second embodiment.

FIG. 2 is a diagram illustrating a configuration example of a storage system according to a second embodiment. The storage system illustrated in FIG. 2 includes a storage apparatus 100 and a host server 200.

The storage apparatus 100 includes a controller module (CM) 110 and a drive unit 120.

The CM 110 is coupled to the host server 200 via a storage area network (SAN) using a fiber channel (FC), an Internet small computer system interface (iSCSI), or the like. The CM 110 is a storage control apparatus that controls access to storage devices mounted in the drive unit 120 in response to a request from the host server 200. The CM 110 is an example of the storage control apparatus 10 illustrated in FIG. 1.

A plurality of storage devices to be accessed from the host server 200 are mounted in the drive unit 120. In this embodiment, the drive unit 120 is, for example, a disk array device in which HDDs 121, 122, 123, . . . are mounted as storage devices.

The host server 200 is a server apparatus that executes various types of processing such as business processing, for example. A plurality of host servers 200 may be coupled to the CM 110.

A hardware configuration example of the CM 110 is described using FIG. 2. The CM 110 includes a processor 111, a random-access memory (RAM) 112, an SSD 113, a channel adapter (CA) 114, and a drive interface (DI) 115.

The processor 111 centrally controls the entire CM 110. The processor 111 may be a multiprocessor. The processor 111 is, for example, a central processing unit (CPU), a microprocessor unit (MPU), a digital signal processor (DSP), an application-specific integrated circuit (ASIC), or a programmable logic device (PLD). The processor 111 may be a combination of two or more elements among a CPU, an MPU, a DSP, an ASIC, and a PLD.

The RAM 112 is used as a main storage device of the CM 110. The RAM 112 temporarily stores at least part of an operating system (OS) program and an application program to be executed by the processor 111. The RAM 112 also stores various types of data desirable for processing by the processor 111. For example, the RAM 112 is provided with an area for a primary cache which is used to control access to the drive unit 120 in response to a request from the host server 200, and write data and read data are temporarily stored in the primary cache.

The SSD 113 is used as an auxiliary storage device of the CM 110. The SSD 113 stores the OS program, the application program, and the various types of data. The SSD 113 is provided with an area for a secondary cache which is used to control access to the drive unit 120 in response to a request from the host server 200.

The CA 114 is a communication interface for communicating with the host server 200. The DI 115 is a communication interface for communicating with the drive unit 120. The DI 115 is a serial attached SCSI (SAS) interface, for example.

The above hardware configuration implements processing functions of the CM 110.

Figure 3:
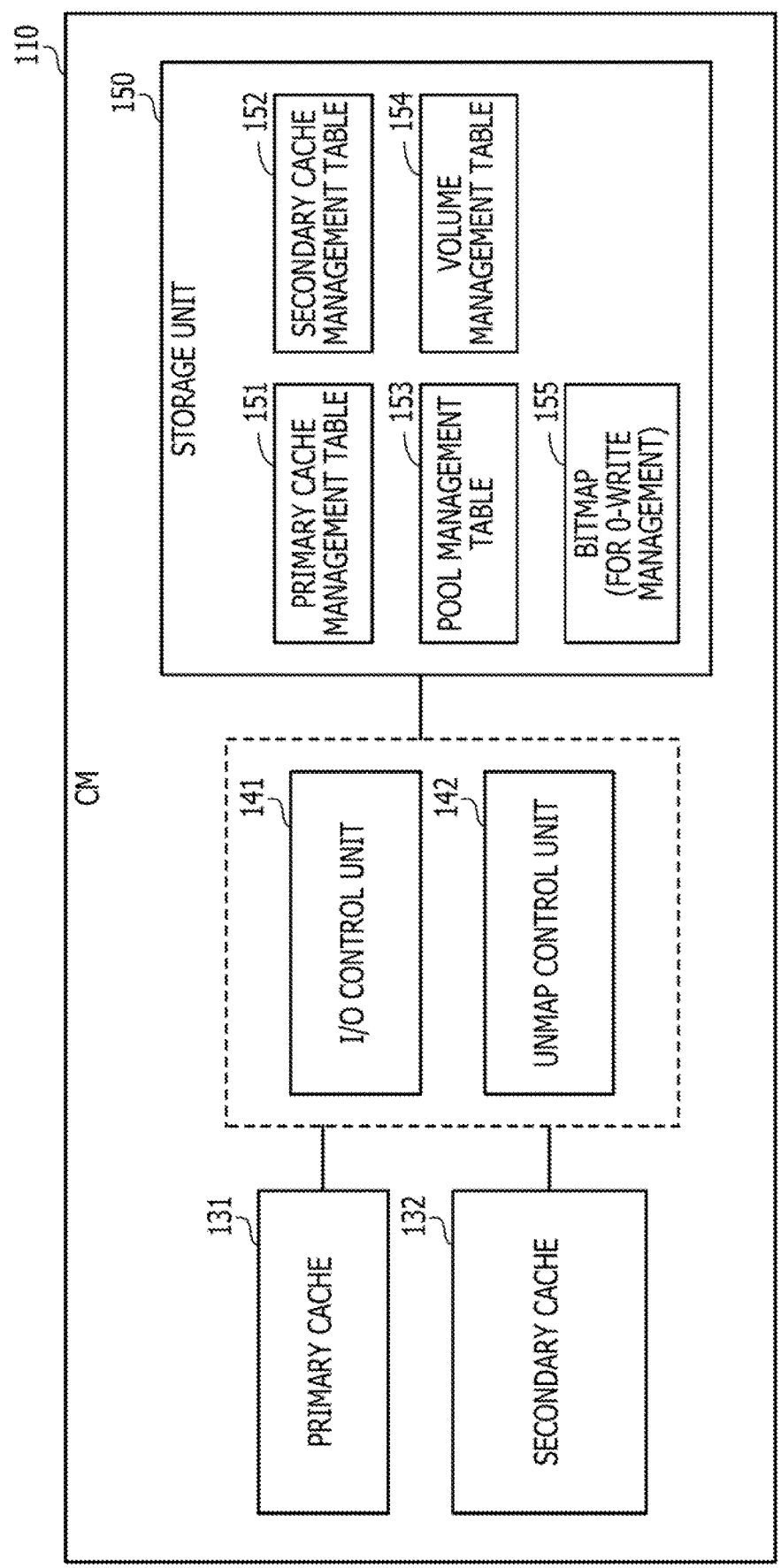
FIG. 3 is a diagram illustrating a configuration example of processing functions included in a controller module (CM)

FIG. 3 is a diagram illustrating a configuration example of the processing functions included in the CM. As illustrated in FIG. 3, the CM 110 includes a primary cache 131, a secondary cache 132, an I/O control unit 141, an UNMAP control unit 142, and a storage unit 150.

The CM 110 generates virtual volumes (logical volumes) by using physical areas provided by the HDDs mounted in the drive unit 120. The CM 110 then accepts access to a virtual volume from the host server 200. The primary cache 131 and the secondary cache 132 are utilized as cache areas in I/O processing for a virtual volume performed in response to a request from the host server 200. The storage area of the primary cache 131 is provided in the RAM 112, and the storage area of the secondary cache 132 is provided in the SSD 113.

Processing by the I/O control unit 141 and the UNMAP control unit 142 is implemented by, for example, executing predetermined programs with the processor 111 included in the CM 110.

The I/O control unit 141 controls the I/O processing for a virtual volume in accordance with a request from the host server 200 by using the primary cache 131 and the secondary cache 132. The allocation of physical areas to the virtual volumes is performed by thin provisioning. The physical areas are allocated only to the areas in the virtual volumes in which data are written.

The UNMAP control unit 142 receives an UNMAP command from the host server 200. An UNMAP command is a command for requesting release of a physical area allocated to a virtual volume, and is one of the standard commands in the SCSI standards.

In this embodiment, upon receipt of an UNMAP command, the UNMAP control unit 142 releases the physical area allocated to the corresponding logical area. In addition, the UNMAP control unit 142 executes "0-write processing" of writing a value "0" to this physical area. This ensures deletion of the data recorded in the released physical area, and suppresses leakage of the data.

At the point when the UNMAP command is received, the UNMAP control unit 142 only releases the physical area, and transmits an UNMAP completion response to the host server 200. The UNMAP control unit 142 then executes a 0-write processing on the released physical area at a subsequent asynchronous timing. By not only releasing the physical area (releasing the allocation to the corresponding logical area) but also completing the 0-write processing, the physical area is brought into a state where data in a logical area to be subsequently and newly allocated may be written to the physical area.

The storage unit 150 is implemented by a storage area in a storage device included in the CM 110, such as the RAM 112 or the SSD 113. The storage unit 150 stores various types of management information to be utilized in the processing by the I/O control unit 141 and the UNMAP control unit 142. For example, the storage unit 150 stores a primary cache management table 151, a secondary cache management table 152, a pool management table 153, a volume management table 154, and bitmaps 155.

The primary cache management table 151 holds management information for managing the data stored in the primary cache 131. For example, in the primary cache management table 151 are registered, for each page in the primary cache 131, information on the position of the stored data in the corresponding virtual volume, flag information indicating whether the data is dirty data, and so on.

The secondary cache management table 152 holds management information for managing the data stored in the secondary cache 132. For example, in the secondary cache management table 152 are registered, for each page in the secondary cache 132, information on the position of the stored data in the corresponding virtual volume, and the type of the data.

The pool management table 153 holds management information on storage pools. A storage pool refers to a physical storage area shared by one or more virtual volumes and implemented by using a plurality of HDDs mounted in the drive unit 120. For example, in the pool management table 153 are registered information on the configuration of each storage pool (such as identification information of the HDDs belonging to the storage pool), information on the allocated chunks and unallocated chunks contained in the storage pool, and so on. A chunk refers to a storage area of a certain size by which data is allocated to a virtual volume.

The volume management table 154 holds management information on the virtual volumes. For example, in the volume management table 154 are registered information on the configuration of each virtual volume (such as the volume size), identification information of the chunks allocated to the unit storage areas in the virtual volume, and so on.

The bitmaps 155 are management information for managing the 0-write processing. A bitmap 155 is prepared for each storage pool and, for each chunk in the storage pool, holds a bit value indicating whether the chunk is an area on which to execute the 0-write processing. For example, each bitmap 155 has a bit for each chunk in the corresponding storage pool. The initial value of each bit is "0". When a chunk becomes an area on which to execute the 0-write processing in response to a request to perform UNMAP of the chunk, the bit value corresponding to the chunk is updated to "1", and the bit value is returned to "0" when the 0-write processing is completed.

Next, the I/O processing for virtual volumes is described.

Figure 4:
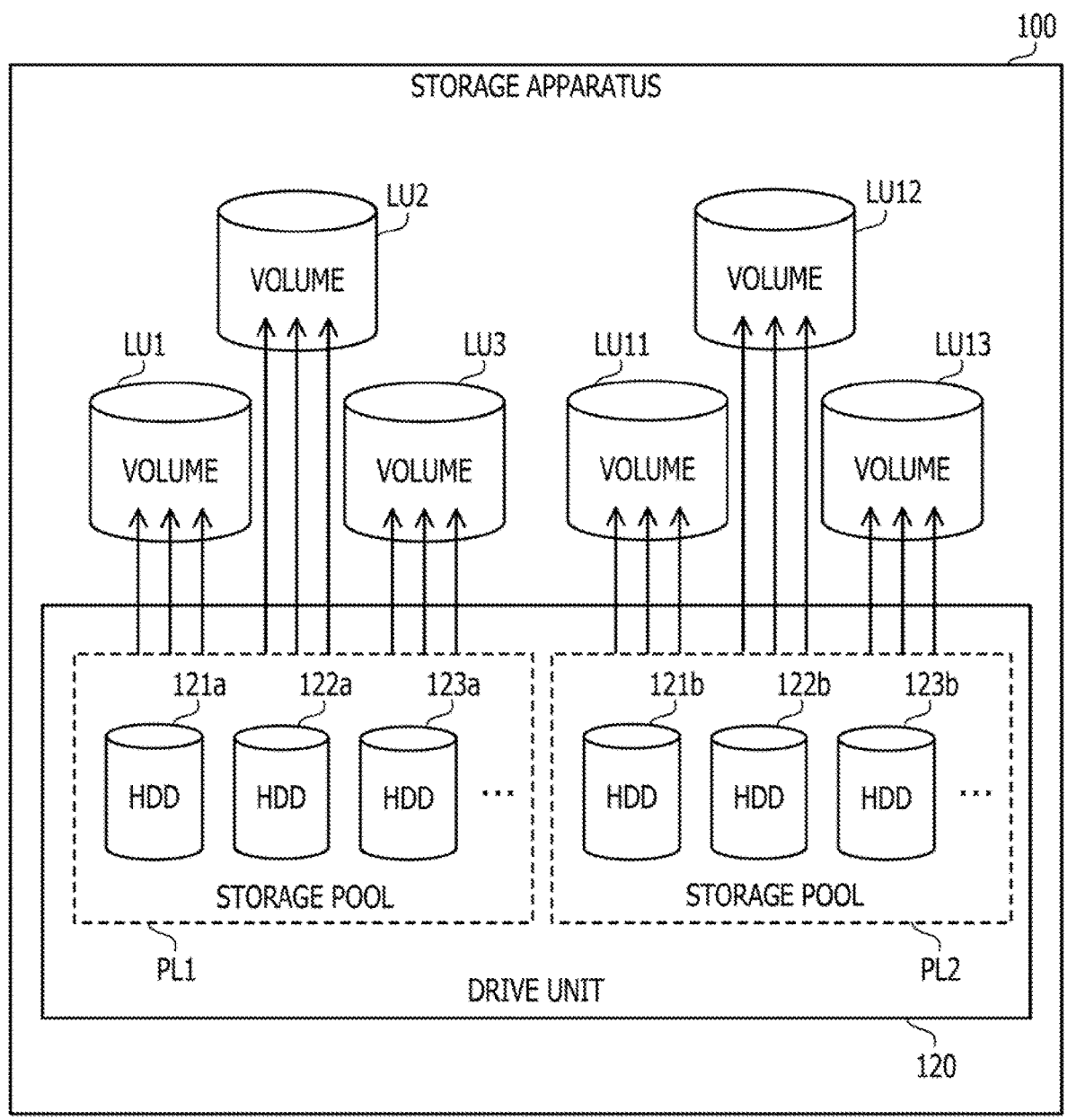
FIG. 4 is a diagram for explaining allocation of physical areas to virtual volumes.

FIG. 4 is a diagram for explaining the allocation of physical areas to virtual volumes. As described earlier, the CM 110 generates virtual volumes (logical volumes) by using physical areas provided by the HDDs mounted in the drive unit 120. The I/O control unit 141 of the CM 110 then accepts access to a virtual volume from the host server 200. The allocation of physical areas to the virtual volumes is performed by thin provisioning. The physical areas are allocated only to the areas in the virtual volumes in which data are written.

In the example of FIG. 4, a storage pool PL1 is generated with HDDs 121a, 122a, 123a, . . . of the drive unit 120, and a storage pool PL2 is generated with HDDs 121b, 122b, 123b, . . . of the drive unit 120. Each of the storage pools PL1 and PL2 is a physical storage area shared by one or more virtual volumes. The physical storage areas of the storage pools PL1 and PL2 are allocated to the virtual volumes in chunks of a certain size.

In practice, each of the storage pools PL1 and PL2 is implemented by one or more redundant array of inexpensive disks (RAID) groups. In this case, in each of the storage pools PL1 and PL2, data are recorded redundantly in the plurality of HDDs.

In FIG. 4, volumes LU1 to LU3 are set as an example of the virtual volumes generated by utilizing the storage pool PL1. In this case, when data is written to any one of the volumes LU1 to LU3 from the host server 200, a chunk(s) corresponding to the size of the data is(are) allocated from the storage pool PL1 to the write destination volume, and the data is stored into the allocated chunk(s).

In FIG. 4, volumes LU11 to LU13 are set as an example of the virtual volumes generated by utilizing the storage pool PL2. In this case, when data is written to any one of the volumes LU11 to LU13 from the host server 200, a chunk(s) corresponding to the size of the data is(are) allocated from the storage pool PL2 to the write destination volume, and the data is stored into the allocated chunk(s).

The volumes LU1 to LU3 and the volumes LU11 to LU13 may be accessed from the same host server 200 or accessed from different host servers 200. For example, the volumes LU1 to LU3 may be accessed from one host server 200, and the volumes Lu11 to LU13 may be accessed from another host server 200.

One of the storage pools PL1 and PL2 is an example of the physical storage area 1 illustrated in FIG. 1. The entirety of the virtual volumes implemented so as to share one of the storage pools PL1 and PL2 is an example of the virtual storage area 2 illustrated in FIG. 1.

Figure 5:
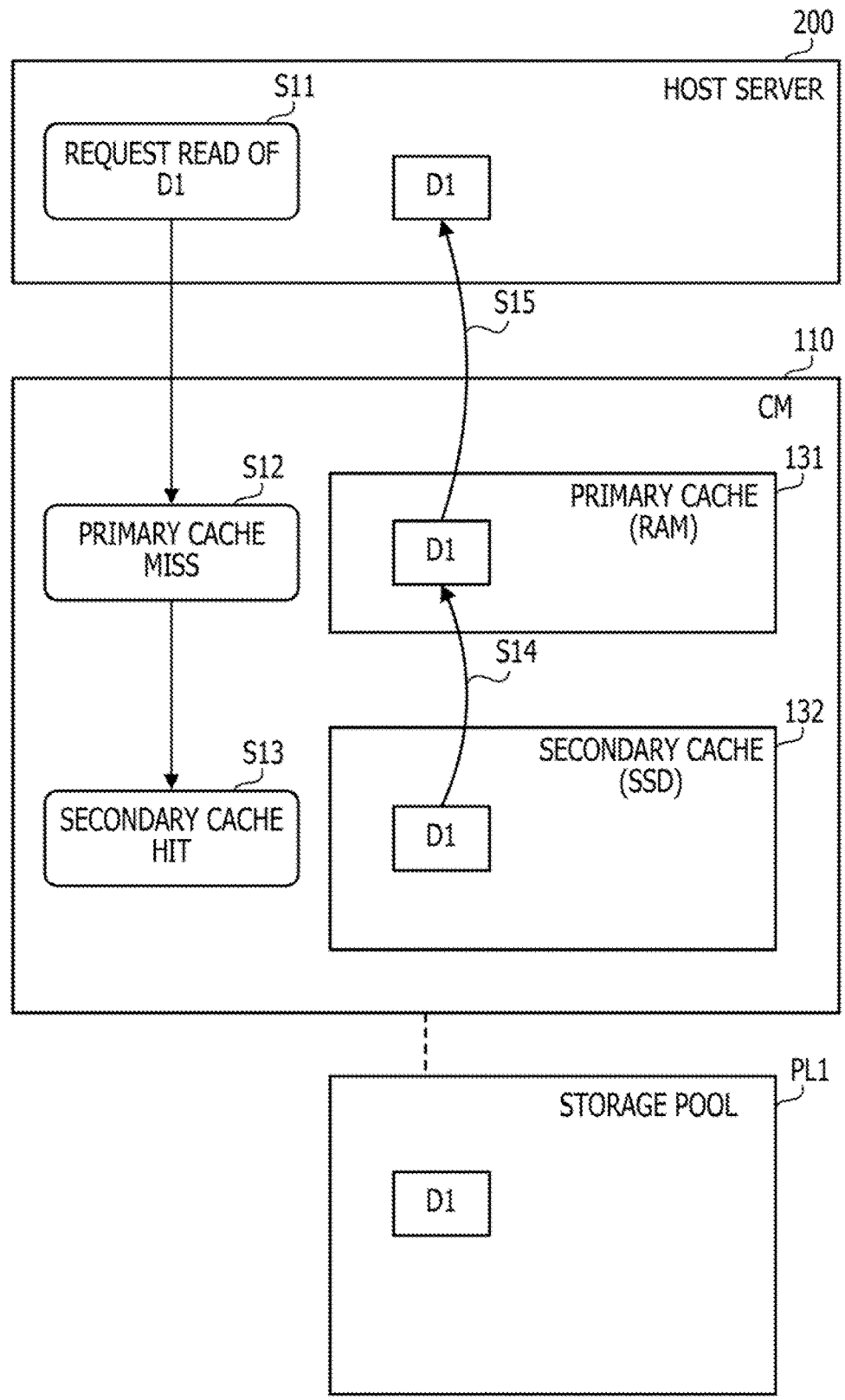
FIG. 5 is a first diagram illustrating an example of a control procedure performed in response to a request to read out data from a virtual volume.
Figure 6:
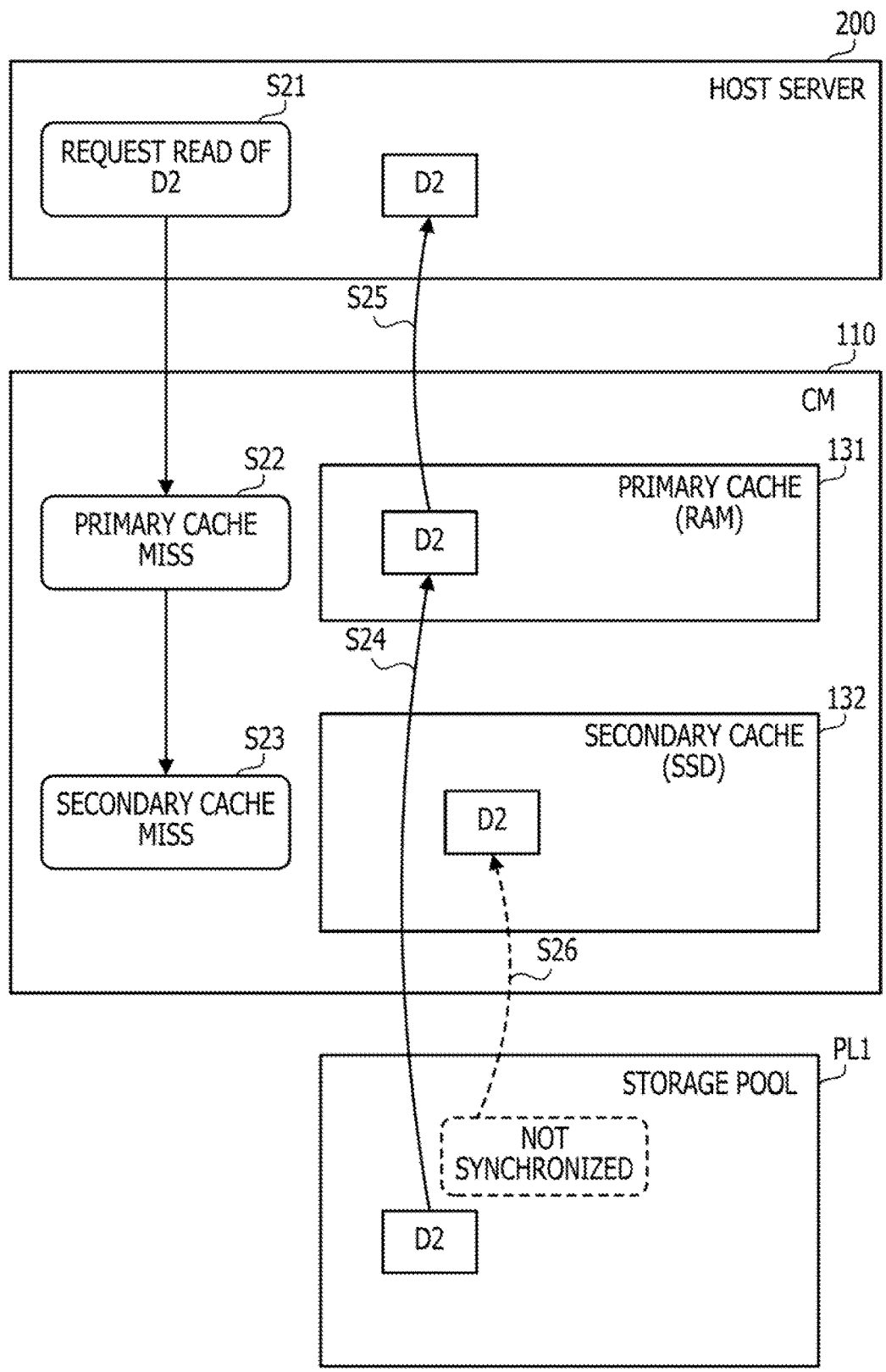
FIG. 6 is a second diagram illustrating an example of a control procedure performed in response to a request to read out data from a virtual volume.

Next, basic procedures of the I/O processing for a virtual volume using the primary cache and the secondary cache are described by using FIGS. 5 and 6. With FIGS. 5 and 6, a description is exemplarily given of cases where data is requested to be read out from a virtual volume generated by utilizing the storage pool PL1.

FIG. 5 is a first diagram illustrating an example of a control procedure performed in response to a request to read out data from a virtual volume.

In this embodiment, the I/O control unit 141 of the CM 110 controls the I/O processing for a virtual volume to be performed in response to a request from the host server 200 by using the primary cache 131 and the secondary cache 132. As illustrated in FIG. 5 and the next. FIG. 6, the secondary cache 132 is basically used as a read cache for reading. Hereinafter, data stored in the area of the read cache is described as "read cache data".

In FIG. 5, the host server 200 requests the CM 110 to read out data D1 in a virtual volume (step S11). The I/O control unit 141 firstly determines whether the data D1 is present in the primary cache 131.

If, though not illustrated, the data D1 is present in the primary cache 131, for example, a primary cache hit is found, the I/O control unit 141 reads out the data D1 from the primary cache 131 and transmits it to the host server 200. Accordingly, the response time for the reading request is shortened. In FIG. 5, however, it is assumed that the data D1 is not present in the primary cache 131, for example, a primary cache miss is found (step S12). In this case, the I/O control unit 141 then determines whether the data D1 is present in the secondary cache 132.

In FIG. 5, it is assumed that the data D1 is present in the secondary cache 132, for example, a secondary cache hit is found (step S13). In this case, the I/O control unit 141 reads out the data D1 from the secondary cache 132 and copies (stages) it to the primary cache 131 (step S14), and further reads out the data D1 from the primary cache 131 and transmits it to the host server 200 (step S15).

The SSD in which the secondary cache 132 is implemented has higher access performance than that of the HDDs which implement the storage pool PL1 allocated to virtual volumes. Thus, as illustrated in FIG. 5, if a primary cache miss is found but a secondary cache hit is found, the data D1 may be read out from the secondary cache 132. In this way, the reading response time for the host server 200 may be shorter than that in a case where the data D1 is read out from a HDD in the storage pool PL1.

If the primary cache 131 does not have a free area immediately before the execution of step S14, the I/O control unit 141 deletes the piece of data with the most recent last access time among the pieces of data in the primary cache 131 from the primary cache 131, for example. The I/O control unit 141 then copies the data D1 to the free area generated in the primary cache 131.

FIG. 6 is a second diagram illustrating an example of a control procedure performed in response to a request to read out data from a virtual volume. In FIG. 6, the host server 200 requests the CM 110 to read out data D2 in a virtual volume (step S21). The I/O control unit 141 determines whether the data D2 is present in the primary cache 131 and the secondary cache 132, as in FIG. 5.

In FIG. 6, it is assumed that a primary cache miss is found (step S22) and a secondary cache miss is found (step S23). In this case, the I/O control unit 141 reads out the data D2 from a HDD included in the storage pool PL1 and copies (stages) it to the primary cache 131 (step S24). The I/O control unit 141 then reads out the data D2 from the primary cache 131 and transmits it to the host server 200 (step S25).

At this point, the I/O control unit 141 records in a predetermined management table (not illustrated) that a secondary cache miss has been found for the block of the data D2. The I/O control unit 141, for example, reads out the data D2 from the HDD included in the storage pool PL1 based on the management table and copies (stages) it to the secondary cache 132 at a subsequent asynchronous timing (step S26). In this way, the data D2 is copied (staged) from the HDD to the secondary cache 132 in the background during the execution of the processing of receiving the I/O request from the host server 200 and the processing of responding to the request.

As described above, in the case of finding a primary cache miss and a secondary cache miss, the data D2 requested to be read out is put into the primary cache 131. In this way, when the same data D2 is subsequently requested to be read out, the I/O control unit 141 may read out the data D2 in a short time from the primary cache 131 and transmit it to the host server 200.

Next, processing performed in response to an UNMAP command is described.

Figure 7:
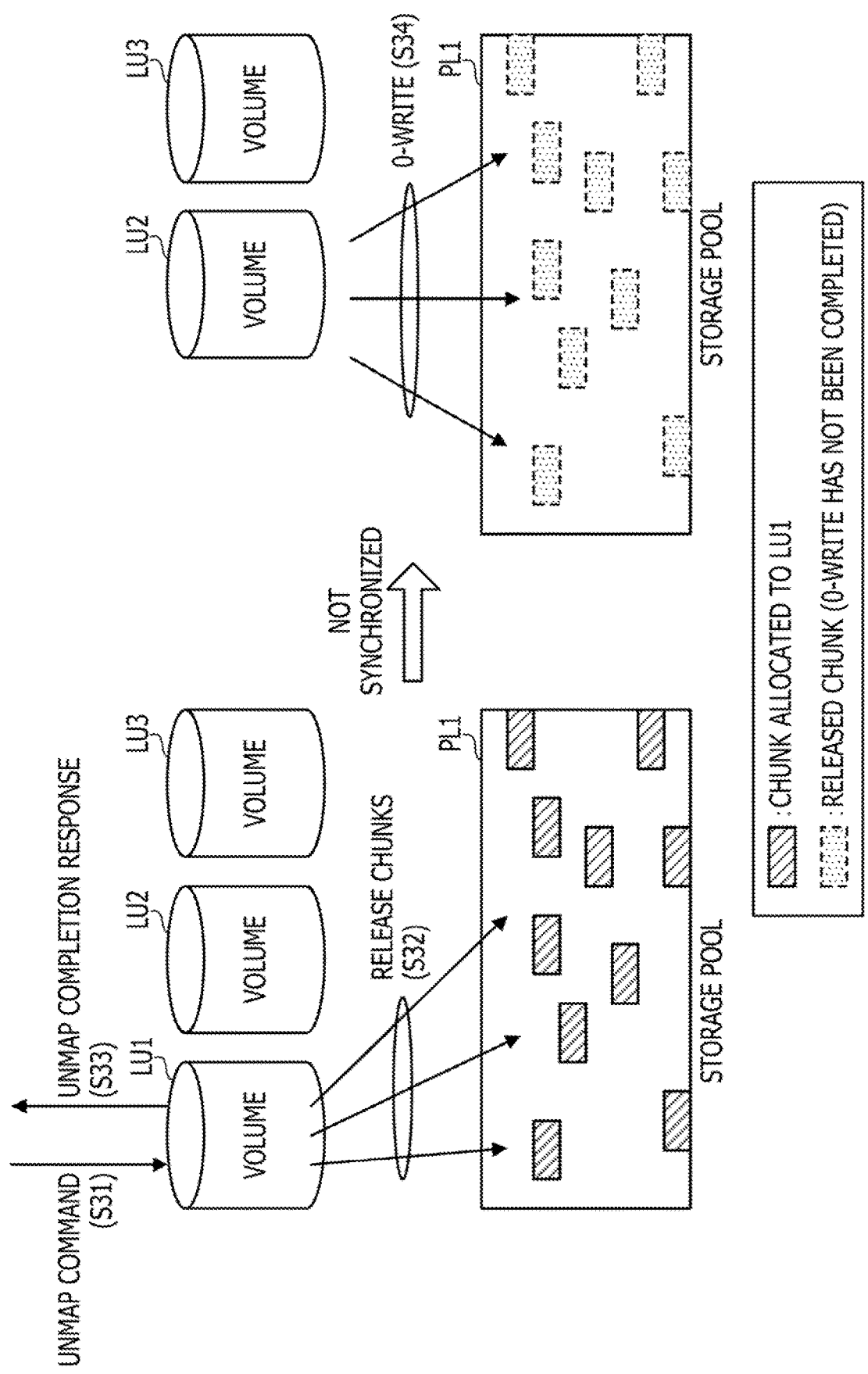
FIG. 7 is a diagram for explaining release of chunks and 0-write processing performed in response to an UNMAP command.

FIG. 7 is a diagram for explaining the release of chunks and the 0-write processing performed in response to an UNMAP command. In this embodiment, the host server 200 is capable of transmitting an UNMAP command during deletion of a virtual volume to request release of the physical areas (chunks) allocated to the virtual volume. The UNMAP control unit 142 of the CM 110 releases these chunks and also executes the 0-write process of writing a value "0" to the chunks. The 0-write process is executed at a timing asynchronous with the reception of the UNMAP command.

FIG. 7 exemplarily illustrates a case where an UNMAP command is transmitted from the host server 200 to delete the volume LU1. Upon receipt of the UNMAP command (step S31), the UNMAP control unit 142 of the CM 110 releases the chunks allocated from the storage pool PL1 to the areas in the volume LU1 in which data are stored (data areas) (step S32). As a result of this chunk release, these chunks are managed as "released chunks (unallocated chunks)" in the pool management table 153. Simultaneously, in the bitmap 155 corresponding to the storage pool PL1, the bit values corresponding to these chunks are updated to "1". When the above processing is completed, the UNMAP control unit 142 transmits a completion response indicating that the UNMAP has been properly completed to the host server 200 (step S33).

The UNMAP control unit 142 writes a value "0" to each released chunk based on the bitmap 155 at a subsequent asynchronous timing (step S34). This ensures deletion of the data stored in each released chunk. Each of these chunks turns to a state where new data may be written thereto at the point when the 0-write processing is completed.

With such processing, the UNMAP control unit 142 makes it possible to quickly respond to the UNMAP request from the host server 200 and also to ensure deletion of the data in the released chunks, thereby suppressing leakage of the data and thus enabling safe operation of the virtual volume.

Figure 8:
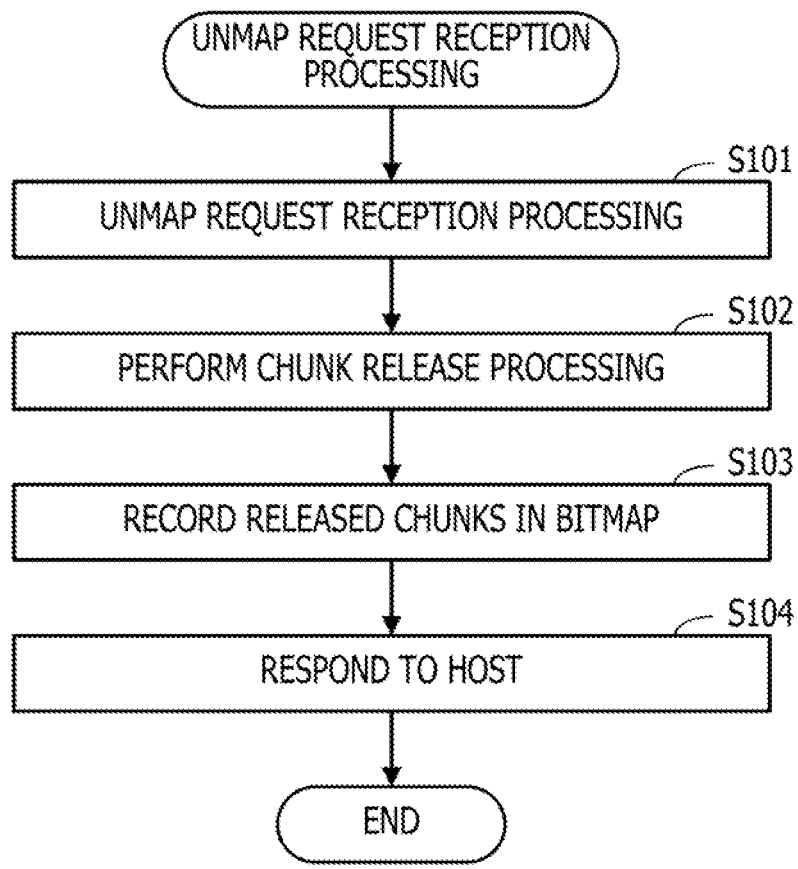
FIG. 8 is an exemplary flowchart illustrating a procedure of UNMAP request reception processing.

FIG. 8 is an exemplary flowchart illustrating a procedure of UNMAP request reception processing.

[Step S101] The UNMAP control unit 142 receives an UNMAP command from the host server 200. In this step, identification information indicating the UNMAP-target virtual volume is specified.

[Step S102] The UNMAP control unit 142 executes processing of releasing the chunks allocated to the UNMAP-target virtual volume. For example, the UNMAP control unit 142 identifies the chunks allocated to the UNMAP-target virtual volume by referring to the volume management table 154. The UNMAP control unit 142 updates the pool management table 153 such that the table indicates that all of the identified chunks have been released (unallocated), and further deletes information on the UNMAP-target virtual volume from the volume management table 154.

The chunks released in step S102 are in a state where they may be allocated to new logical storage areas. However, the 0-write processing for these chunks has not been completed, and thus the chunks are in a state where the data in the allocated logical storage areas may not be written to the chunks. For example, at this point, the released chunks are in a state where they may be reserved as chunks to be allocated to new logical storage areas.

[Step S103] The UNMAP control unit 142 identifies the bitmap 155 corresponding to the storage pool to which the chunks released in step S102 belong, and updates the bit values corresponding to the released chunks among the bit values in the identified bitmap 155 to "1". As a result, the positions of the released chunks are recorded in the bitmap 155.

[Step S104] The UNMAP control unit 142 transmits a completion response indicating that the UNMAP has been properly completed to the host server 200.

Figure 9:
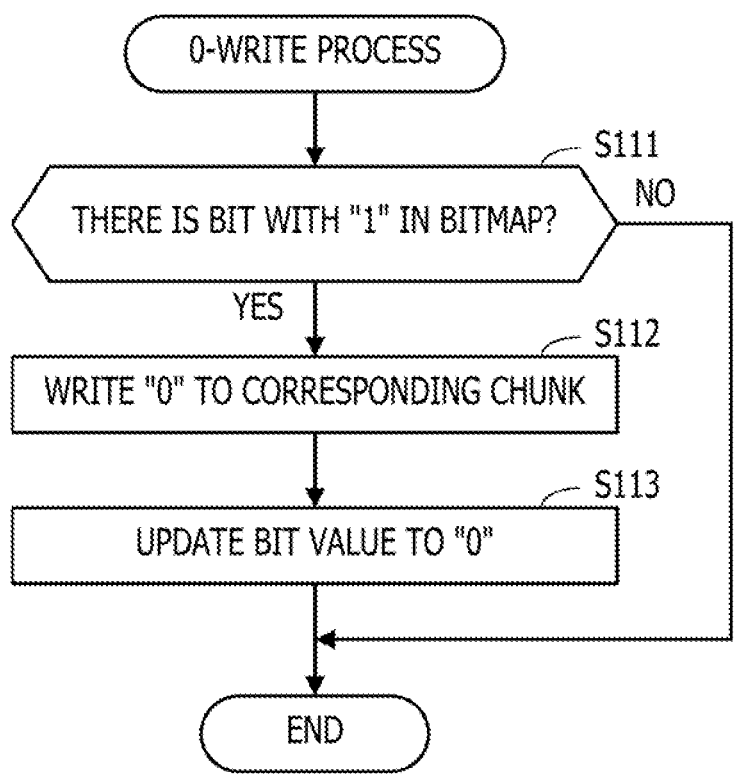
FIG. 9 is an exemplary flowchart illustrating a procedure of the 0-write processing.

FIG. 9 is an exemplary flowchart illustrating a procedure of the 0-write processing. The processing in FIG. 9 is repetitively executed at certain time intervals, for example.

[Step S111] The UNMAP control unit 142 refers to the bitmap 155, and determines whether there is one or more bits with a value "1". The UNMAP control unit 142 moves the processing to step S112 if there is one or more bits with a value "1", and terminates the processing if there is no bit with a value "1".

[Step S112] The UNMAP control unit 142 selects one bit with a value "1" from the bitmap 155, and writes a value "0" to the chunk corresponding to this bit. The value "0" is written to the entire area of the chunk from the start to the end of the bit string therein.

[Step S113] The UNMAP control unit 142 updates the values of the bits selected in step S112 among the bits in the bitmap 155 to "0".

As described above, the UNMAP control unit 142 regularly checks the bitmap 155 and executes the 0-write processing on a chunk corresponding a bit with a value "1". Thus, the 0-write processing is executed not in synchronization with the UNMAP request reception processing.

Next, a description is given of processing performed in a case where a new volume is generated after the volume LU1 is deleted as in FIG. 7.

Figure 10:
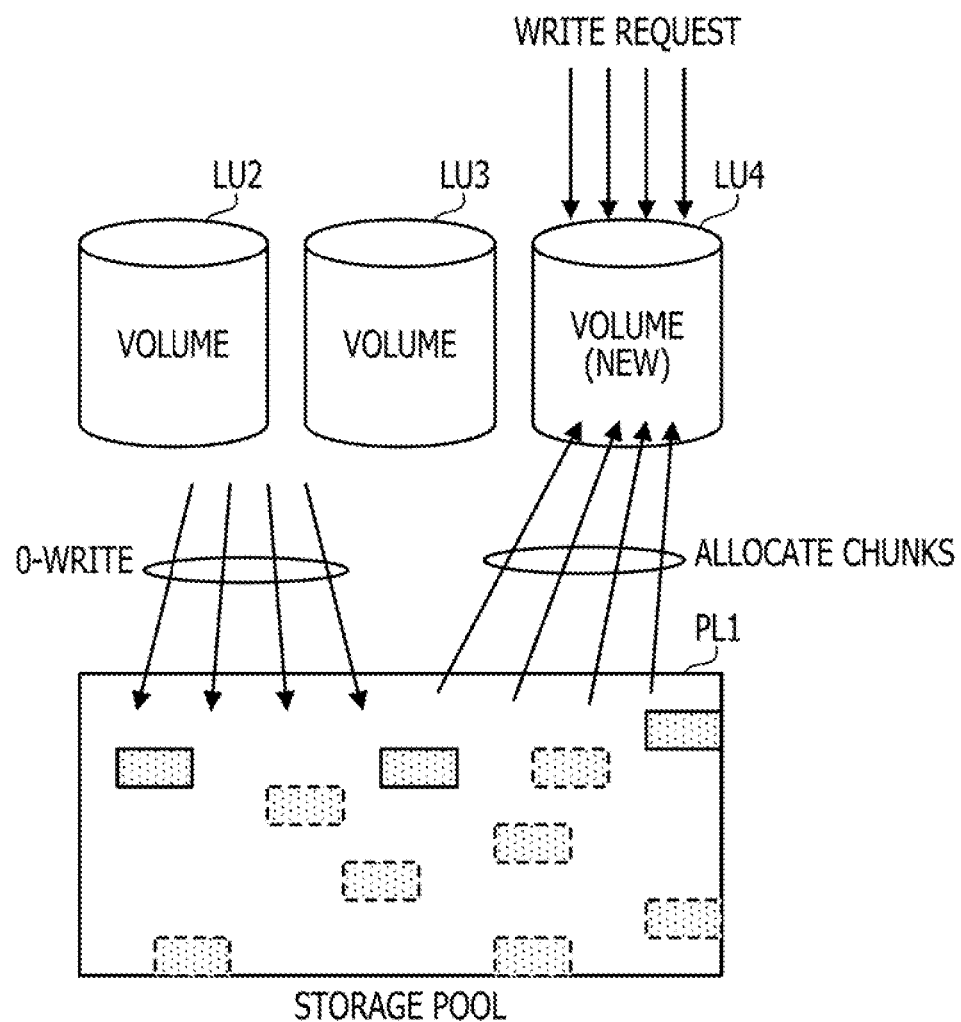
FIG. 10 is a diagram illustrating processing performed in a case where a new volume is generated.

FIG. 10 is a diagram illustrating the processing performed in the case where a new volume is generated. FIG. 10 exemplarily assumes that the volume LU1 has been deleted as in FIG. 7 and a new volume LU4 is generated while the 0-write processing is executed on the chunks allocated to the volume LU1. The new volume LU4 is allocated chunks from the storage pool PL1.

When UNMAP is requested on a per volume basis as in FIG. 7, a large number of chunks might be released at once. In this case, the 0-write processing is executed on a large number of chunks in the storage pool PL1. Thus, a large number of chunks for which the 0-write processing has not been completed may be remaining in the storage pool PL1 when the new volume LU4 is generated.

FIG. 10 illustrates a state where the chunks in the storage pool PL1 released from the volume LU1 include both chunks for which the 0-write processing has not been completed and chunks on which the 0-write processing has been executed. The chunks for which the 0-write processing has not been completed have already been released and thus are in a state where the chunks may be allocated to new logical storage areas but the data in the logical storage areas may not be written to the chunks.

In the volumes LU2 to LU4, on the other hand, data areas in which data are written thereafter are allocated released (unallocated) chunks from the storage pool PL1. For example, when a new volume is generated, a large amount of data are requested to be written to this volume in some cases. FIG. 10 illustrates a state where a large amount of data are requested to be written to the new volume LU4.

The data requested to be written are temporarily stored in the primary cache 131, at which point chunks are allocated from the storage pool PL1 to new data areas in the virtual volume. At this point, the data are not written to the chunks, but the chunks are only reserved for the data.

In a state where there remain a large number of chunks for which the 0-write processing has not been completed as mentioned above, data areas in which data are newly written might be allocated released chunks for which the 0-write processing has not been completed. For example, the larger the amount of new data to be written, the higher the possibility of the new data areas being allocated chunks for which the 0-write processing has not been completed. For example, in a case where a large amount of data are requested to be written to the new volume LU4 as in FIG. 10, there is a high possibility of the volume LU4 being allocated chunks for which the 0-write processing has not been completed. In a case where the free area in the storage pool PL1 is small immediately before the deletion of the volume LU1, there is a high possibility of the new data areas being allocated a large number of chunks for which the 0-write processing has not been completed.

Figure 11:
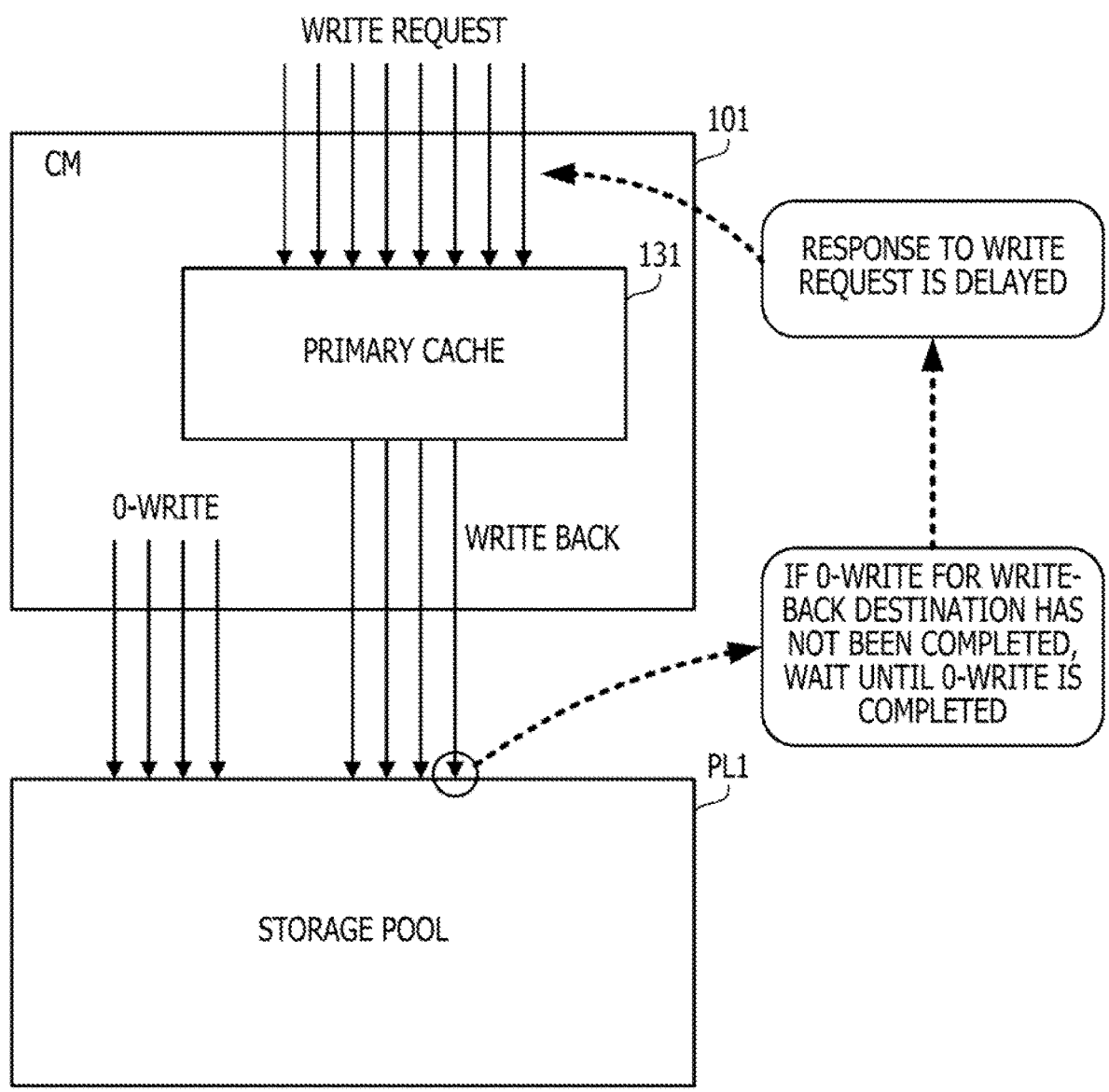
FIG. 11 is a diagram illustrating a comparative example of processing in a case where the 0-write processing and write processing for a virtual volume are executed in parallel.
Figure 12:
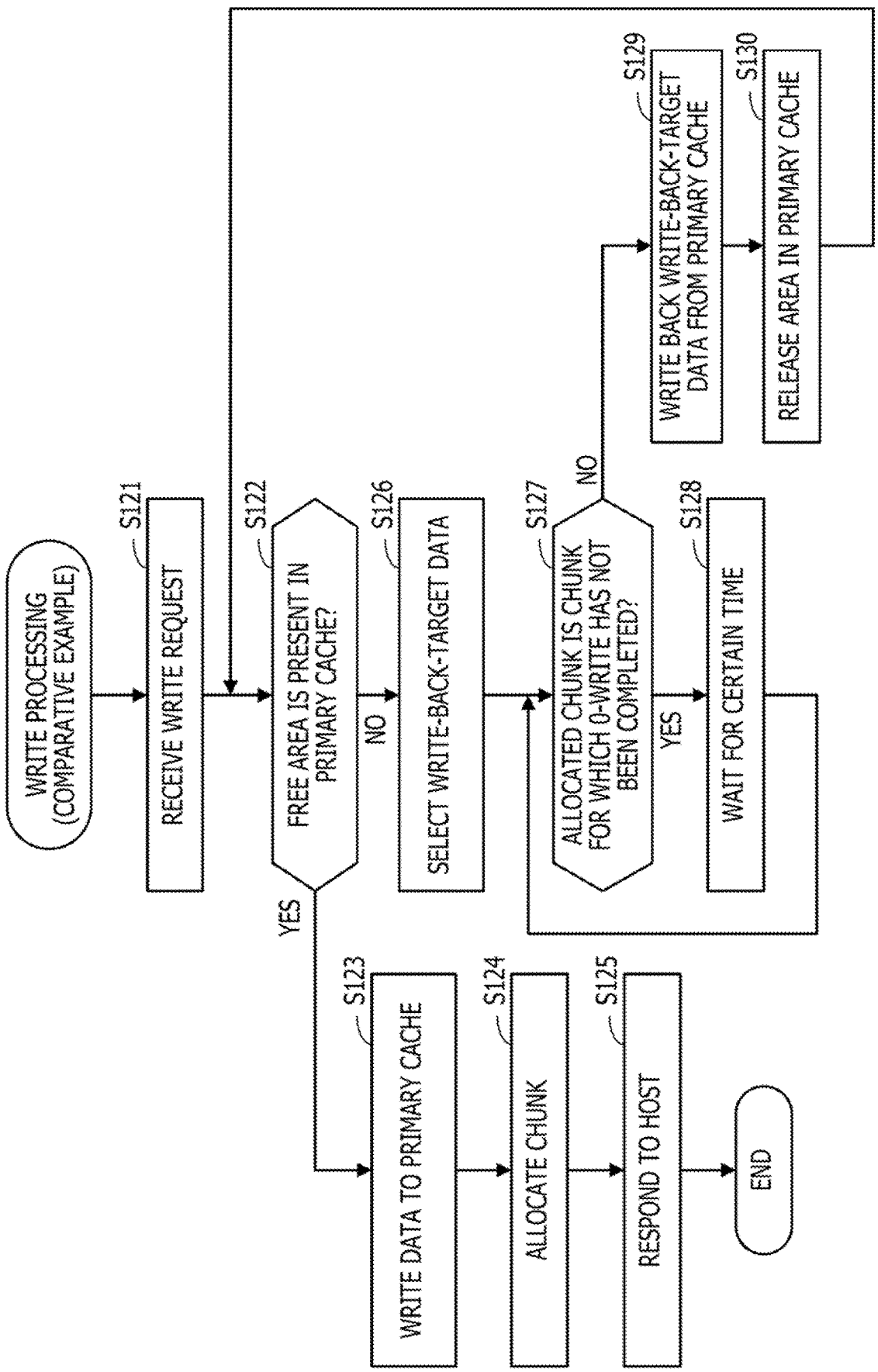
FIG. 12 is a flowchart illustrating a comparative example of write processing for a virtual volume.

A problem with write processing is described by illustrating a comparative example of write processing for a virtual volume in FIGS. 11 and 12.

FIG. 11 is a diagram illustrating a comparative example of processing in a case where the 0-write processing and write processing for a virtual volume are executed in parallel.

In response to a write request for a virtual volume, the write data is stored into the primary cache 131, and a chunk is allocated from the storage pool PL1 to the write destination area in the virtual volume. Thereafter, when a write-back of the write data from the primary cache 131 is performed, the write data is stored into the allocated chunk.

In a case where a large amount of data are requested to be written, the free space in the primary cache 131 decreases. Without performing a write-back of data from the primary cache 131 to release areas in the primary cache 131, the primary cache 131 will eventually be unable to store new write data. In this state, the write-back performance significantly affects the response time for a write request.

In a case where the write-back destination chunk is a chunk on which the 0-write processing has been executed or a chunk which is not subject to the 0-write processing, the write-back-target data may be immediately written to the chunk to complete the write back. However, in a case where the write-back destination chunk is a chunk for which the 0-write processing has not been completed, the write-back-target data may not be written to the chunk until the 0-write processing is completed.

The 0-write processing is performed in chunks having a size of several tens of MB to several hundreds of MB. On the other hand, for a write request for a virtual volume, the writing is performed in terms of about several KB to 1 MB, and the unit for write-back is the same. For this reason, if the write-back destination chunk is a chunk for which the 0-write processing has not been completed, a far longer time than the writing time for the write back has to be waited in many cases, until the 0-write processing is completed. In this case, it takes a significantly long time to perform the write back, which will result in a significant delay in responding to the write request.

As explained in FIG. 10, in a situation where the 0-write processing and write processing for a virtual volume are executed in parallel, there is a possibility that a large number of chunks for which the 0-write processing has not been completed are allocated to the data areas for the new write data. Thus, in a case where a large amount of data are requested to be written, there is a high probability that when a write-back is performed to release an area in the primary cache 131, the write-back destination chunk is a chunk for which the 0-write processing has not been completed. This deteriorates the response performance for a write request.

If such a situation continues, the amount of data requested to be written per unit time will be larger than the amount of data that may be written back from the primary cache 131 per unit time. Consequently, the CM 110 will be unable to handle all write requests issued from the host server 200 and thus fail to respond to the write requests. In such a state, there is a possibility of a system failure.

FIG. 12 is a flowchart illustrating a comparative example of write processing for a virtual volume. FIG. 12 exemplarily illustrates a case where data are requested to be written to virtual volumes sharing the physical areas in the storage pool PL1.

[Step S121] The I/O control unit 141 receives write requests from the host server 200. For example, the write requests received from the host server 200 are sequentially stored into a reception queue not illustrated. In step S121, the I/O control unit 141 takes out one write request from the start of the reception queue.

[Step S122] The I/O control unit 141 determines whether a free area to store the write data requested to be written is present in the primary cache 131 based on the primary cache management table 151. The presence of the free area is determined by, for example, whether or not the free area ratio is a predetermined ratio or more. The I/O control unit 141 moves the processing to step S123 when the free area is present, and moves the processing to step S126 when the free area is not present.

In this process of step S122, in a case where, for example, pieces of read cache data to be read out are present in the primary cache 131, the determination result will be No if it is determined that the free area will not be present even by deleting all of the pieces of read cache data. If it is determined that the free area will be generated in the primary cache 131 by deleting the pieces of read cache data, the I/O control unit 141 deletes the pieces of read cache data from the primary cache 131 to thereby release the corresponding area, and then executes the process of step S123.

[Step S123] The I/O control unit 141 writes the write data to the free area in the primary cache 131. The I/O control unit 141 also registers information on the logical position of the write data in the virtual volume in the primary cache management table 151 in association with the write destination page for the write data.

[Step S124] The I/O control unit 141 allocates an unallocated chunk from the storage pool PL1 to the write area for the write data in the virtual volume. For example, the I/O control unit 141 registers an identification number of the allocated chunk in the volume management table 154 in association with the write area for the write data in the virtual volume. At this point, the data is not written to the chunk, but the chunk is only reserved for the data.

There is a possibility that this chunk allocated in step S124 is a chunk for which the 0-write processing has not been completed. In step S124, a chunk may be preferentially allocated from among the unallocated chunks in the storage pool PL1 excluding the chunks for which the 0-write processing has not been completed, for example.

[Step S125] The I/O control unit 141 transmits a completion response indicating that the writing of the data has been properly completed to the host server 200.

[Step S126] Based on the primary cache management table 151, the I/O control unit 141 selects write-back-target data from among the pieces of dirty data which are stored in the primary cache 131 and whose write-back has not been completed. For example, from among the pieces of dirty data, the piece of dirty data with the most recent last access time is selected as the write-back-target data.

[Step S127] The I/O control unit 141 identifies the chunk allocated to the write destination area for the selected piece of dirty data among the areas in the virtual volume based on the volume management table 154. The I/O control unit 141 refers to the bitmap 155 corresponding to the storage pool PL1, and determines whether the identified chunk is a chunk for which the 0-write processing has not been completed.

"The 0-write processing has not been completed" mentioned here means that the chunk has been subject to the 0-write processing due to an UNMAP command but the 0-write processing has not been completed (a value "0" has not been written). It is determined that the 0-write processing has not been completed if the value of the bit in the bitmap 155 corresponding to this chunk is "1". If the 0-write processing has not been completed, the I/O control unit 141 moves the processing to step S128. Otherwise (if the 0-write processing has been executed or the chunk is not subjected to the 0-write processing), the I/O control unit 141 moves the processing to step S129.

[Step S128] The I/O control unit 141 waits for a certain time to wait for the 0-write processing to be completed. After the certain time, the process of step S127 is executed again.

[Step S129] The I/O control unit 141 performs a write-back of the selected write-back-target data from the primary cache 131 to the chunk (writes the selected write-back-target data to the chunk).

[Step S130] The I/O control unit 141 releases the area in the primary cache 131 in which the write-back-target data was stored. For example, the I/O control unit 141 deletes the information on the logical position of the write-back-target data in the virtual volume registered in the primary cache management table 151 in association with the page in which the write-back-target data was stored.

The processing is then moved to step S122. In step S122, the determination result is "Yes" if a free area large enough to store the write data is obtained in the primary cache 131 by the area release in step S130.

In the above-described processing in FIG. 12, if the determination result in step S127 is "Yes", the processing waits until the 0-write processing for the write-back destination chunk is executed. This accordingly increases the time taken for the write-back. As the time taken for the write-back thus increases, the time taken to generate a free area in the primary cache 131 increases. Accordingly, it takes time to respond to the write request.

For example, in a case where a large number of chunks for which the 0-write processing has not been completed are generated as a result of deleting a virtual volume as in FIG. 7 and a large amount of data are requested to be written to a new virtual volume as in FIG. 10, the probability that the determination result in step S127 will be "Yes" is high. Consequently, the response performance for a write request gradually deteriorates and, in some cases, deteriorates to a state where it is impossible to respond.

Figure 13:
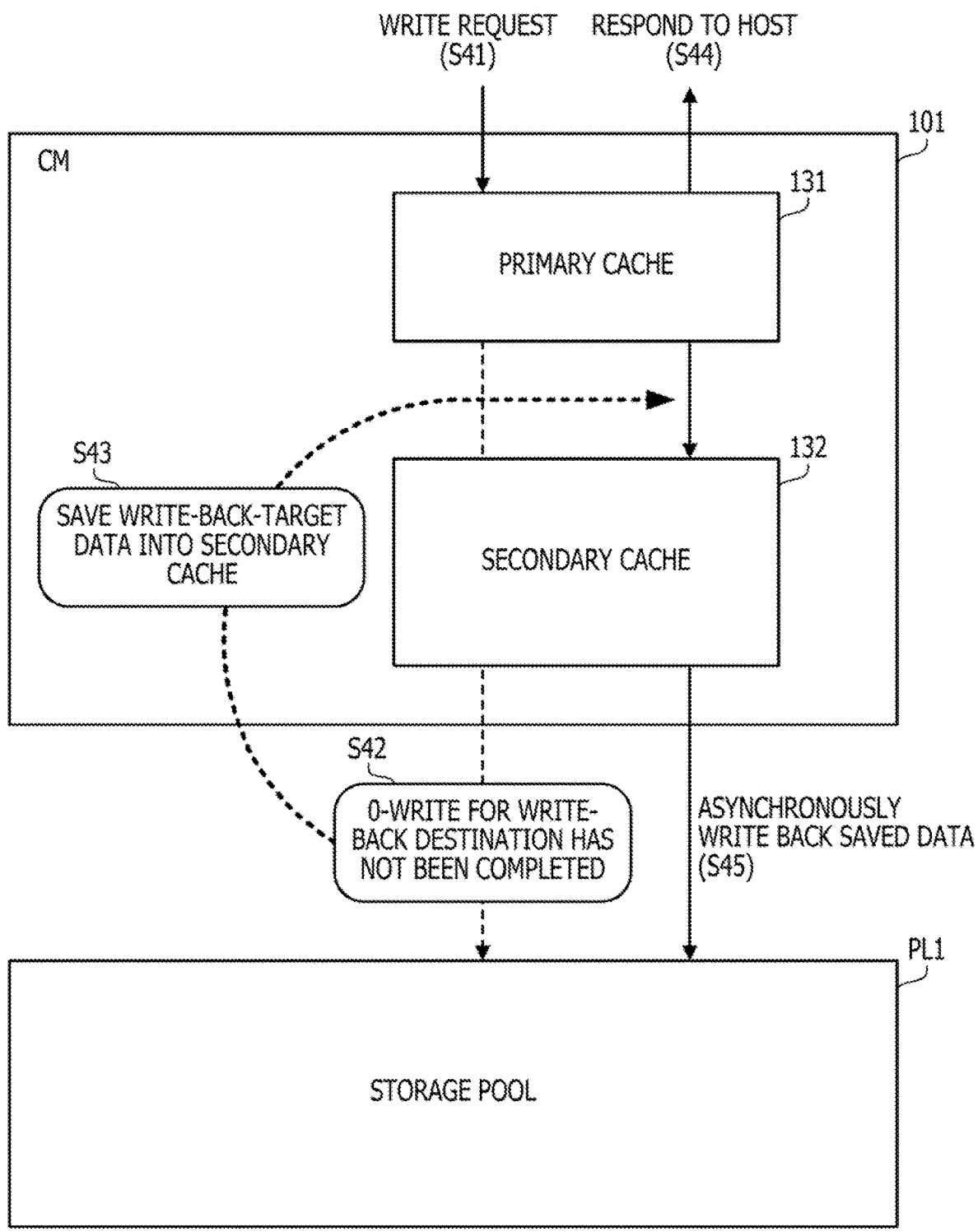
FIG. 13 is a diagram illustrating write control in the second embodiment.

In light such a problem, in this embodiment, when the write-back destination chunk is a chunk for which the 0-write processing has not been completed, the write-back-target data is stored (saved) into the secondary cache 132 instead of the chunk, as illustrated in the next FIG. 13. This suppresses delay in responding to a write request due to the 0-write processing being a bottleneck.

FIG. 13 is a diagram illustrating write control in the second embodiment.

In FIG. 13, it is assumed that, when data is requested to be written to a virtual volume (step S41), it is determined that a sufficient free area is not present in the primary cache 131 and that a write-back is has to be performed. The I/O control unit 141 selects write-back-target data from among the pieces of dirty data in the primary cache 131. It is assumed that the chunk allocated to the write destination area for the selected write-back-target data is a chunk for which the 0-write processing has not been completed (step S42).

In this case, the I/O control unit 141 saves the selected write-back-target data from the primary cache 131 into the secondary cache 132 (step S43) to thereby obtain a free area in the primary cache 131. The I/O control unit 141 then writes the write data requested to be written to the free area in the primary cache 131, and transmits a completion response indicating that the writing has been properly completed to the host server 200 (step S44).

At a subsequent asynchronous timing, the I/O control unit 141 determines whether the 0-write processing for the write-back destination chunk has been completed. If the 0-write processing has been completed, the I/O control unit 141 performs a write-back of the write-back-target data saved in the secondary cache 132 (saved data) to the chunk (step S45).

With such processing, the time taken to generate a free area in the primary cache 131 may be shorter than that in a case where the write-back waits until the 0-write processing for the write-back destination chunk is completed, as in the comparative examples in FIGS. 11 and 12. This may shorten the response time for the write request received in step S41.

For example, even in a case where a large number of chunks for which the 0-write processing has not been completed are generated as a result of deleting a virtual volume as in FIG. 7 and a large amount of data are requested to be written to a new virtual volume as in FIG. 10, the deterioration in the response performance for a write request may be suppressed. This may reduce the possibility of becoming unable to respond to a write request from the host server 200. Accordingly, the stability of operation of the I/O control is improved.

As explained in FIGS. 5 and 6, the secondary cache 132 basically stores read cache data staged from storage pools. The priority of this read cache data is lower than that of write-back-target data. It is impossible to respond to a data write request if write-back-target data may not be moved out of the primary cache 131. On the other hand, even if read cache data corresponding to data requested to be read out is not present in the secondary cache 132, it is still possible to obtain the requested data from a storage pool and thus respond to the reading request.

Thus, if read cache data is stored in the secondary cache 132 when write-back-target data has to be saved into the secondary cache 132 but the secondary cache 132 does not have a free area, this read cache data may be deleted to obtain a free area in the secondary cache 132. Therefore, when write-back-target data has to be saved, the possibility that this data may be stored into the secondary cache 132 is high. This increases the effect of improving the response performance for a write request.

FIG. 14 is a diagram illustrating a configuration example of the secondary cache management table. The secondary cache management table 152 contains a record for each page in the secondary cache 132. Each record contains information on a physical position, a logical position, a saved data flag, and access frequency.

The physical position is address information of the page in the secondary cache 132. In the physical position item in each record, the address information of the corresponding page is registered. In each of the logical position item, the access frequency item, and the saved data flag item, an invalid value (NULL) is registered in a case where data is not stored in the page.

The logical position is logical address information of data stored in the page. This logical address information contains the identification information of the virtual volume, and information indicating a logical address range in the virtual volume. In the logical position item, logical address information is registered when data is stored into the page.

The saved data flag is flag information indicating whether the data stored in the page is saved data saved from the primary cache 131 or read cache data. In an example, the saved data flag indicates that the stored data is saved data when "1", and indicates that the stored data is read cache data when "0".

The access frequency is information on the frequency of access to the data stored in the page. In the access frequency item, the information is registered only when the data stored in the page is read cache data. For example, in the access frequency item, an initial value "0" is registered when read cache data is stored into the page, and this value is incremented to be updated when the read cache data is accessed from the host server 200. As will be described later, the access frequency is utilized to determine which piece of read cache data to delete among the pieces of read cache data stored in the secondary cache 132.

Figure 15:
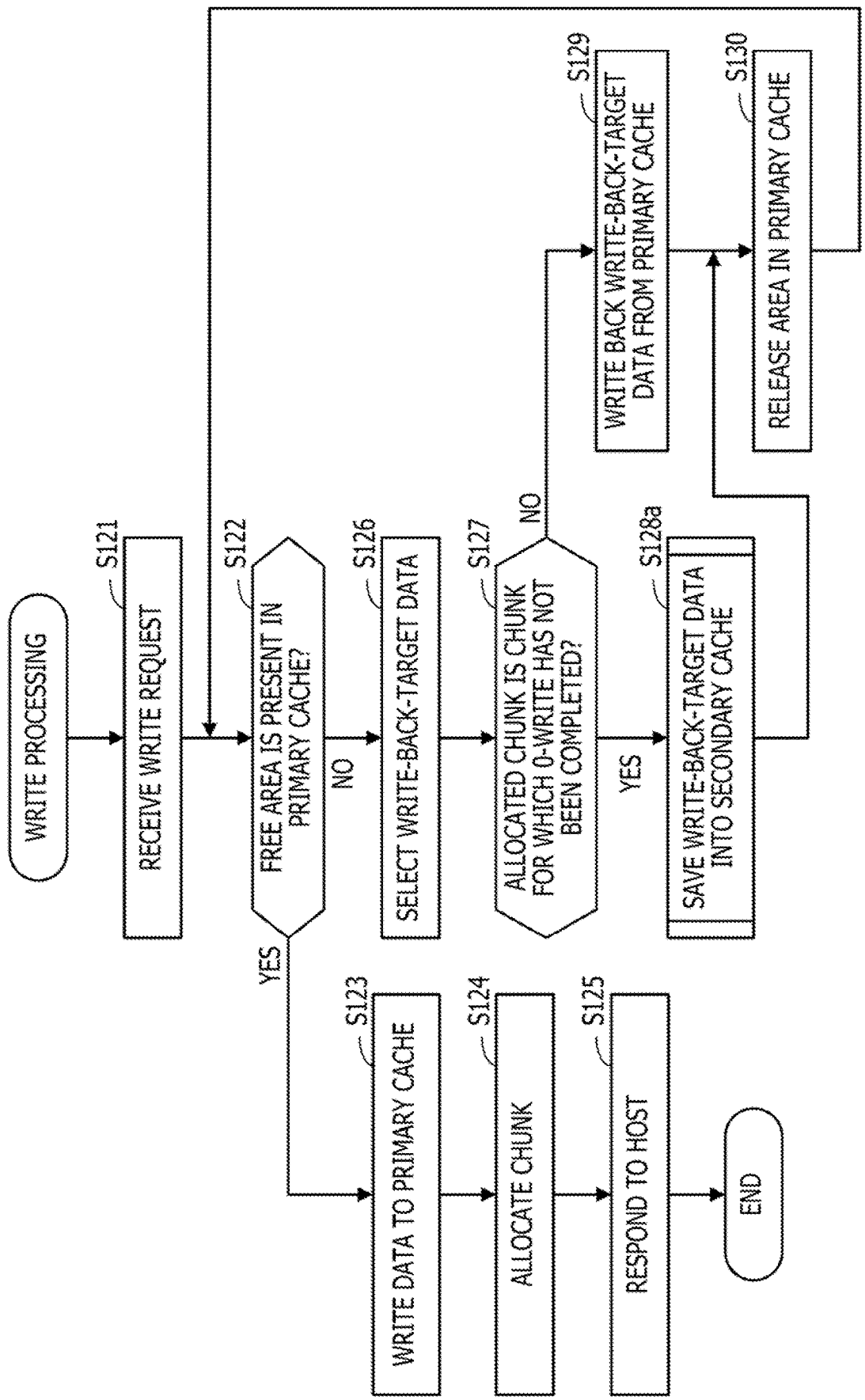
FIG. 15 is a flowchart illustrating an example of write processing for a virtual volume in the second embodiment.

FIG. 15 is a flowchart illustrating an example of write processing for a virtual volume in the second embodiment. In this FIG. 15, the steps with the same processing contents as those in FIG. 12 are illustrated with the same step numbers.

In this embodiment, a process of step S128a is executed instead of the process of step S128 in FIG. 12. In step S128a, the I/O control unit 141 executes saving processing of saving write-back-target data from the primary cache 131 into the secondary cache 132. Thereafter, the processing is moved to step S130.

Figure 16:
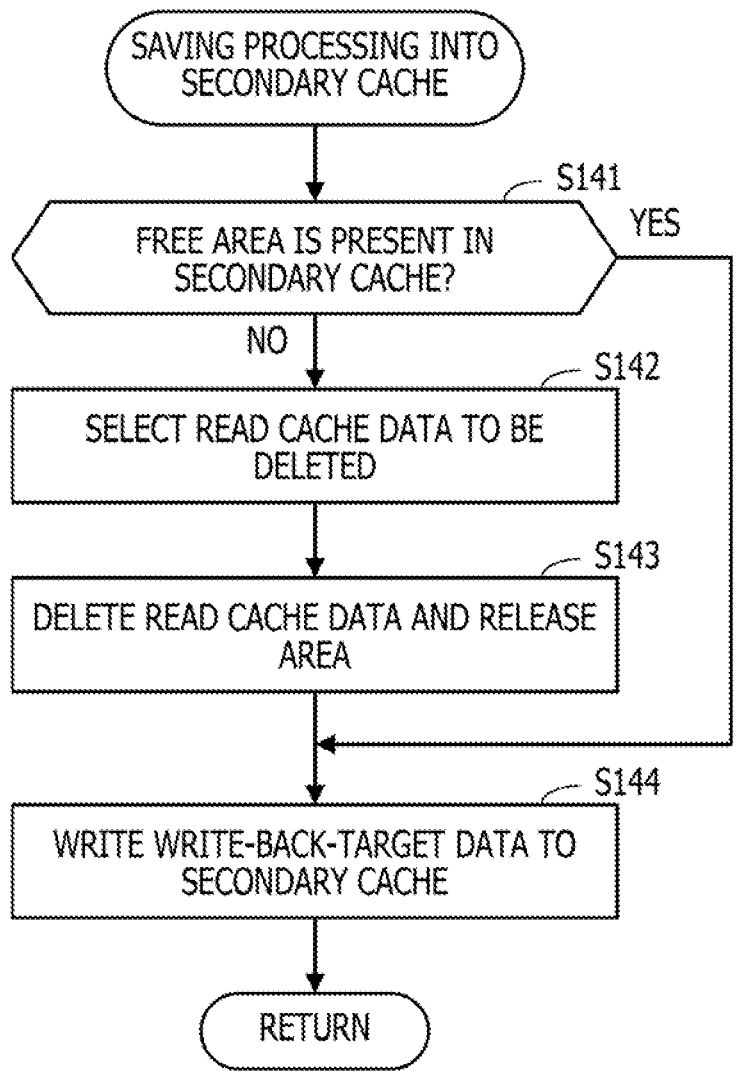
FIG. 16 is a flowchart illustrating an example of processing of saving write-back-target data into a secondary cache.

FIG. 16 is a flowchart illustrating an example of processing of saving write-back-target data into the secondary cache. This processing in FIG. 16 corresponds to the process of step S128a in FIG. 15.

[Step S141] The I/O control unit 141 determines whether a free area to store the write-back-target data is present in the secondary cache 132 based on the secondary cache management table 152. In this process, it is determined whether the free area is present in the secondary cache 132 excluding all pieces of data therein including read cache data and saved data saved from the primary cache 131. For example, the presence of the free area is determined by whether or not the ratio of such free areas is a predetermined ratio or more. The I/O control unit 141 moves the processing to step S144 if the free area is present, and moves the processing to step S142 if the free area is not present.

[Step S142] The I/O control unit 141 selects a piece of read cache data to be deleted to obtain a write area for the write-back-target data from among the pieces of read cache data stored in the secondary cache 132. For example, from among the records in the secondary cache management table 152 whose saved data flag is "0" (for example, the records of pages storing read cache data), the I/O control unit 141 selects the record with the lowest access frequency. The read cache data corresponding to the selected record is to be deleted.

[Step S143] The I/O control unit 141 deletes the read cache data selected in step S142 from the secondary cache 132 and releases the area in which the read cache data has been stored.

[Step S144] The I/O control unit 141 writes the write-back-target data to the secondary cache 132. In the case where step S143 has been executed, the write-back-target data is written to the area released in step S143. The I/O control unit 141 also identifies the record corresponding to the write destination page for the write-back-target data from the secondary cache management table 152. In the identified record, the I/O control unit 141 registers the logical position of the write-back-target data, sets the saved data flag to "1", and sets NULL in the access frequency item. The processing is then moved to step S130 in FIG. 15.

By the above processing in FIG. 16, the write-back-target data is saved from the primary cache 131 into the secondary cache 132, so that a free area is generated in the primary cache 131. In this case, the time taken to generate a free area in the primary cache 131 is shorter than that in the case of waiting until the 0-write processing for the write-back destination chunk for the write-back-target data is completed. Accordingly, the response time for a write request may be shortened.

Figure 17:
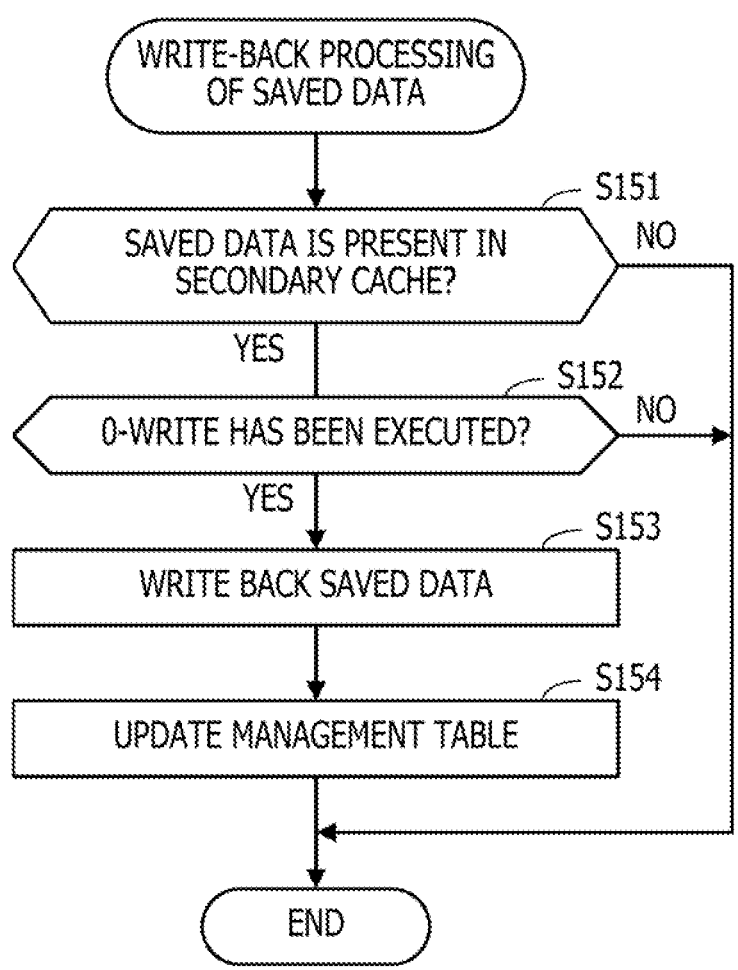
FIG. 17 is a flowchart illustrating an example of write-back processing for saved data saved in the secondary cache.

FIG. 17 is a flowchart illustrating an example of write-back processing for saved data saved in the secondary cache. The processing in FIG. 17 is repetitively executed at certain time intervals, for example.

[Step S151] The UNMAP control unit 142 refers to the secondary cache management table 152 and determines whether one or more pieces of saved data saved from the primary cache 131 are present in the secondary cache 132. If there is even one record in the secondary cache management table 152 whose saved data flag is "1", it is determined that a piece of saved data is present in the secondary cache 132. The UNMAP control unit 142 moves the processing to step S152 if a piece of saved data is present, and terminates the processing if no saved data is present.

[Step S152] The UNMAP control unit 142 selects one page storing saved data based on the secondary cache management table 152. The UNMAP control unit 142 refers to the volume management table 154 based on the logical position of the saved data in the selected page, and identifies the chunk allocated to the write-destination logical storage area for the saved data.

The UNMAP control unit 142 determines whether the 0-write processing for the identified chunk has been executed based on the bitmap 155. It is determined that the 0-write processing has not been executed if the value of the bit corresponding to the identified chunk among the bits in the bitmap 155 is "1", and ti is determined that the 0-write processing has been executed if the value of the bit is "0". The UNMAP control unit 142 moves the processing to step S153 if the 0-write processing has been executed, and terminates the processing if the 0-write processing has not been executed.

[Step S153] The UNMAP control unit 142 writes (performs a write-back of) the saved data stored in the page selected in step S152 to the allocated chunk.

[Step S154] The UNMAP control unit 142 identifies the record corresponding to the page selected in step S152 from the secondary cache management table 152. The UNMAP control unit 142 updates both the logical position and the saved data flag in the identified record to NULL. As a result, this page in the secondary cache 132 is released and becomes a free area.

As described above, whether the 0-write processing is executed on the write-back destination chunk for the saved data saved in the secondary cache 132 is monitored, and a write-back to the chunk is performed if the 0-write processing is executed.

The processing functions of the apparatuses (for example, the storage control apparatus 10 and the CM 110) illustrated in each of the above embodiments may be implemented by a computer. In such a case, there is provided a program describing processing contents of functions to be included in each apparatus, and the computer executes the program to implement the aforementioned processing functions in the computer. The program describing the processing contents may be recorded on a computer-readable recording medium. The computer-readable recording medium includes a magnetic storage device, an optical disc, a magneto-optical recording medium, a semiconductor memory, and the like. The magnetic storage device includes a hard disk drive (HDD), a magnetic tape, and the like. The optical disc includes a compact disc (CD), a digital versatile disc (DVD), a Biu-ray disc (BD, registered trademark), and the like. The magneto-optical recording medium includes a magneto-optical (MO) disk and the like.

In order to distribute the program, for example, portable recording media, such as DVDs and CDs, on which the program is recorded are sold. The program may also be stored in a storage device of a server computer and be transferred from the server computer to other computers via a network.

The computer that executes the program, for example, stores the program recorded on the portable recording medium or the program transferred from the server computer in its own storage device. The computer then reads the program from its own storage device and performs processing according to the program. The computer may also directly read the program from the portable recording medium and perform processing according to the program. The computer may also sequentially perform processes according to the received program each time the program is transferred from the server computer coupled to the computer via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage control apparatus comprising:
a memory; and
a processor coupled to the memory and configured to:
receive a release request for a first storage area in a virtual storage area,
in response to the receiving of the release request for the first storage area, release, among unit storage areas included in a physical storage area, one or more first unit storage areas allocated to the first storage area from the first storage area to manage each of the released one or more first unit storage areas as an unallocated unit storage area,
execute overwrite processing of writing 0 to each of the released one or more first unit storage areas at a timing asynchronous with a response to the release request for the first storage area, and
in response to a write request to store write data to the virtual storage area, execute write processing including:
allocating the unallocated unit storage area among the unit storage areas included in the physical storage area to a write destination area for the write data in the virtual storage area, and
in a case where it is determined that the primary cache lacks a free area,
selecting write-back-target data from the primary cache,
saving the selected write-back-target data into a secondary cache in a case where a second unit storage area allocated to a second storage area being a write destination area for the selected write-back-target data in the virtual storage area is an area for which the overwrite processing has not been completed,
releasing a third storage area in the primary cache in which the selected write-back-target data was stored, and
write the write data to the released third storage area to respond to the write request.

2. The storage control apparatus according to claim 1, wherein the processor is configured to manage the one or more first unit storage areas as unallocated unit storage areas.

3. The storage control apparatus according to claim 1, wherein the processor is configured to:
determine whether the overwrite processing for the second unit storage area has been completed, at a timing asynchronous with the saving of the selected data into the secondary cache, and
perform a write-back of the selected data to the second unit storage area if it is determined that the overwrite processing has been completed.

4. The storage control apparatus according to claim 1, wherein the processor is configured to:
when it is determined that the secondary cache lacks a free area, select read cache data staged from the physical storage area among pieces of data stored in the secondary cache,
delete the read cache data from the secondary cache, and
write the selected data to an area in the secondary cache released by the deletion.

5. The storage control apparatus according to claim 1, wherein the processor is configured to:
when the second unit storage area is an area on which the overwrite processing has been executed or an area which is not subject to the overwrite processing, perform a write-back of the selected data to the second unit storage area and releasing the second storage area in the primary cache, and
write the write data to the released second storage area and responding to the write request.

6. A non-transitory computer-readable storage medium storing a program that causes a computer to execute a process, the process comprising:
- receiving a release request for a first storage area in a virtual storage area;
- in response to the receiving of the release request for the first storage area, releasing, among unit storage areas included in a physical storage area, one or more first unit storage areas allocated to the first storage area from the first storage area to manage each of the released one or more first unit storage areas as an unallocated unit storage area;
- executing overwrite processing of writing 0 to each of the released one or more first unit storage areas at a timing asynchronous with a response to the release request for the first storage area; and
- in response to a write request to store write data to the virtual storage area, executing write processing including:
- allocating the unallocated unit storage area among the unit storage areas included in the physical storage area to a write destination area for the write data in the virtual storage area, and
  - in a case where it is determined that the primary cache lacks a free area,
  - selecting write-back-target data from the primary cache,
  - saving the selected write-back-target data into a secondary cache in a case where a second unit storage area allocated to a second storage area being a write destination area for the selected write-back-target data in the virtual storage area is an area for which the overwrite processing has not been completed,
  - releasing a third storage area in the primary cache in which the selected write-back-target data was stored, and
  - write the write data to the released third storage area to respond to the write request.

7. The non-transitory computer-readable storage medium according to claim 6, the process comprising managing the one or more first unit storage areas as unallocated unit storage areas.

8. The non-transitory computer-readable storage medium according to claim 6, wherein the process comprises:
- determining whether the overwrite processing for the second unit storage area has been completed, at a timing asynchronous with the saving of the selected data into the secondary cache; and
- performing a write-back of the selected data to the second unit storage area if it is determined that the overwrite processing has been completed.

9. The non-transitory computer-readable storage medium according to claim 6, wherein the write processing includes:
- when it is determined that the secondary cache lacks a free area, selecting read cache data staged from the physical storage area among pieces of data stored in the secondary cache;
- deleting the read cache data from the secondary cache; and
- writing the selected data to an area in the secondary cache released by the deletion.

10. The non-transitory computer-readable storage medium according to claim 6, wherein the write processing includes:
- when the second unit storage area is an area on which the overwrite processing has been executed or an area which is not subject to the overwrite processing, performing a write-back of the selected data to the second unit storage area and releasing the second storage area in the primary cache; and
- writing the write data to the released second storage area and responding to the write request.

* * * * *